(12) United States Patent
Makimoto et al.

(10) Patent No.: US 11,787,258 B2
(45) Date of Patent: Oct. 17, 2023

(54) REFRIGERATION CYCLE DEVICE

(71) Applicant: DENSO CORPORATION, Kariya (JP)

(72) Inventors: Naoya Makimoto, Kariya (JP); Yoshiki Kato, Kariya (JP)

(73) Assignee: DENSO CORPORATION, Kariya (JP)

( * ) Notice: Subject to any disclaimer, the term of this patent is extended or adjusted under 35 U.S.C. 154(b) by 752 days.

(21) Appl. No.: 16/799,467

(22) Filed: Feb. 24, 2020

(65) Prior Publication Data

US 2020/0207178 A1 Jul. 2, 2020

Related U.S. Application Data

(63) Continuation of application No. PCT/JP2018/028966, filed on Aug. 2, 2018.

(30) Foreign Application Priority Data

Aug. 31, 2017 (JP) .................... 2017-166626

(51) Int. Cl.
*B60H 1/00* (2006.01)
*B60H 1/32* (2006.01)

(52) U.S. Cl.
CPC ..... *B60H 1/00007* (2013.01); *B60H 1/00885* (2013.01); *B60H 1/3227* (2013.01); *B60H 1/32281* (2019.05); *B60H 2001/00928* (2013.01); *B60H 2001/00949* (2013.01); *B60H 2001/325* (2013.01); *B60H 2001/3263* (2013.01); *B60H 2001/3283* (2013.01)

(58) Field of Classification Search
CPC ...... B60H 1/00007; B60H 2011/00949; B06H 1/00007; B06H 1/32281; B06H 1/00885
See application file for complete search history.

(56) References Cited

U.S. PATENT DOCUMENTS

| | | |
|---|---|---|
| 2005/0229615 A1 | 10/2005 | Nakamura |
| 2012/0255319 A1 | 10/2012 | Itoh et al. |
| 2014/0150476 A1 | 6/2014 | Liu |
| 2015/0121939 A1 | 5/2015 | Takeuchi et al. |
| 2015/0159933 A1 | 6/2015 | Itoh et al. |
| 2016/0185184 A1 | 6/2016 | Morishita et al. |
| 2016/0297283 A1 | 10/2016 | Sakamoto et al. |

(Continued)

FOREIGN PATENT DOCUMENTS

| | | | |
|---|---|---|---|
| CN | 104169112 A | 11/2014 | |
| CN | 110997369 A | * 4/2020 | ......... B60H 1/00921 |

(Continued)

OTHER PUBLICATIONS

Written Opinion of the International Searching Authority dated Mar. 3, 2020 (Year: 2020).*

(Continued)

*Primary Examiner* — Elizabeth J Martin
(74) *Attorney, Agent, or Firm* — Harness, Dickey & Pierce, P.L.C.

(57) ABSTRACT

In a refrigeration cycle device, in an operation mode in which a refrigerant does not flows into a cooling evaporator, a throttle opening degree characteristic of a heat absorption valve disposed upstream of a heat absorption evaporator is set to cause the refrigerant on the outlet side of the heat absorption evaporator to be in a gas-liquid two-phase state.

4 Claims, 10 Drawing Sheets

(56) References Cited

U.S. PATENT DOCUMENTS

| | | |
|---|---|---|
| 2017/0197490 A1 | 7/2017 | Enomoto et al. |
| 2017/0203635 A1 | 7/2017 | Kuroda et al. |
| 2018/0251011 A1 | 9/2018 | Sugimura et al. |

FOREIGN PATENT DOCUMENTS

| | | | | |
|---|---|---|---|---|
| JP | 2005289152 A | | 10/2005 | |
| JP | 2012225637 A | | 11/2012 | |
| JP | 2014037179 A | | 2/2014 | |
| JP | 2014516860 A | | 7/2014 | |
| JP | 2014160594 A | | 9/2014 | |
| JP | 2015067206 A | * | 4/2015 | ......... B60H 1/00921 |
| JP | 2015101180 A | | 6/2015 | |
| JP | 2016003828 A | | 1/2016 | |
| WO | WO-2016/059791 A1 | | 4/2016 | |
| WO | WO-2017038677 A1 | | 3/2017 | |

OTHER PUBLICATIONS

Translation CN-110997369-A.*
Translation JP-2015067206-A.*
Translation CN-110997369-A (Year: 2020).*
Translation JP-2015067206-A (Year: 2015).*

* cited by examiner

REFRIGERATION CYCLE DEVICE

CROSS REFERENCE TO RELATED APPLICATIONS

The present application is a continuation application of International Patent Application No. PCT/JP2018/028966 filed on Aug. 2, 2018, which designated the U.S. and claims the benefit of priority from Japanese Patent Application No. 2017-166626 filed on Aug. 31, 2017. The entire disclosures of all of the above applications are incorporated herein by reference.

TECHNICAL FIELD

The present disclosure relates to a refrigeration cycle device for an air conditioner.

BACKGROUND

A vapor compression type refrigeration cycle device is applied to a vehicular air conditioner. The refrigeration cycle device switches, for example, a refrigerant circuit in a cooling mode for cooling a ventilation air that is blown into a vehicle compartment, a refrigerant circuit in a heating mode for heating the ventilation air, and a refrigerant circuit in a dehumidification heating mode for reheating the ventilation air that has been cooled and dehumidified.

SUMMARY

According to a first aspect of the present disclosure, a refrigeration cycle device for an air conditioner includes: a compressor that compresses and discharges a refrigerant mixed with a refrigerator oil; a heat exchanger that heats a ventilation air by using a heat of the refrigerant discharged from the compressor as a heat source; a branch passage that branches a flow of a high-pressure refrigerant flowing out from the heat exchanger; a cooling valve that reduces a pressure of the refrigerant flowing out from one refrigerant outflow port of the branch passage; a cooling evaporator that evaporates the refrigerant by heat exchange between the refrigerant reduced in pressure by the cooling valve and the ventilation air; a heat absorption valve that reduces a pressure of the refrigerant flowing out from another refrigerant outflow port of the branch passage; a heat absorption evaporator that evaporates the refrigerant by heat exchange between the refrigerant reduced in pressure by the heat absorption valve and a heat source fluid; and a circuit switching valve that switches between a refrigerant circuit allowing the refrigerant to flow into the cooling evaporator and a refrigerant circuit preventing the refrigerant from flowing into the cooling evaporator. The heat absorption valve adjusts a throttle opening degree to cause a heat-absorption refrigerant on an outlet side of the heat absorption evaporator to be in a gas-liquid two-phase state when the circuit switching valve is switched to the refrigerant circuit that prevents the refrigerant from flowing into the cooling evaporator and a predetermined condition is satisfied.

BRIEF DESCRIPTION OF DRAWINGS

The details of one or more embodiments are set forth in the accompanying drawings and the description below. Other features and advantages will be apparent from the description and drawings, and from the claims.

DETAILED DESCRIPTION

Figure 1:
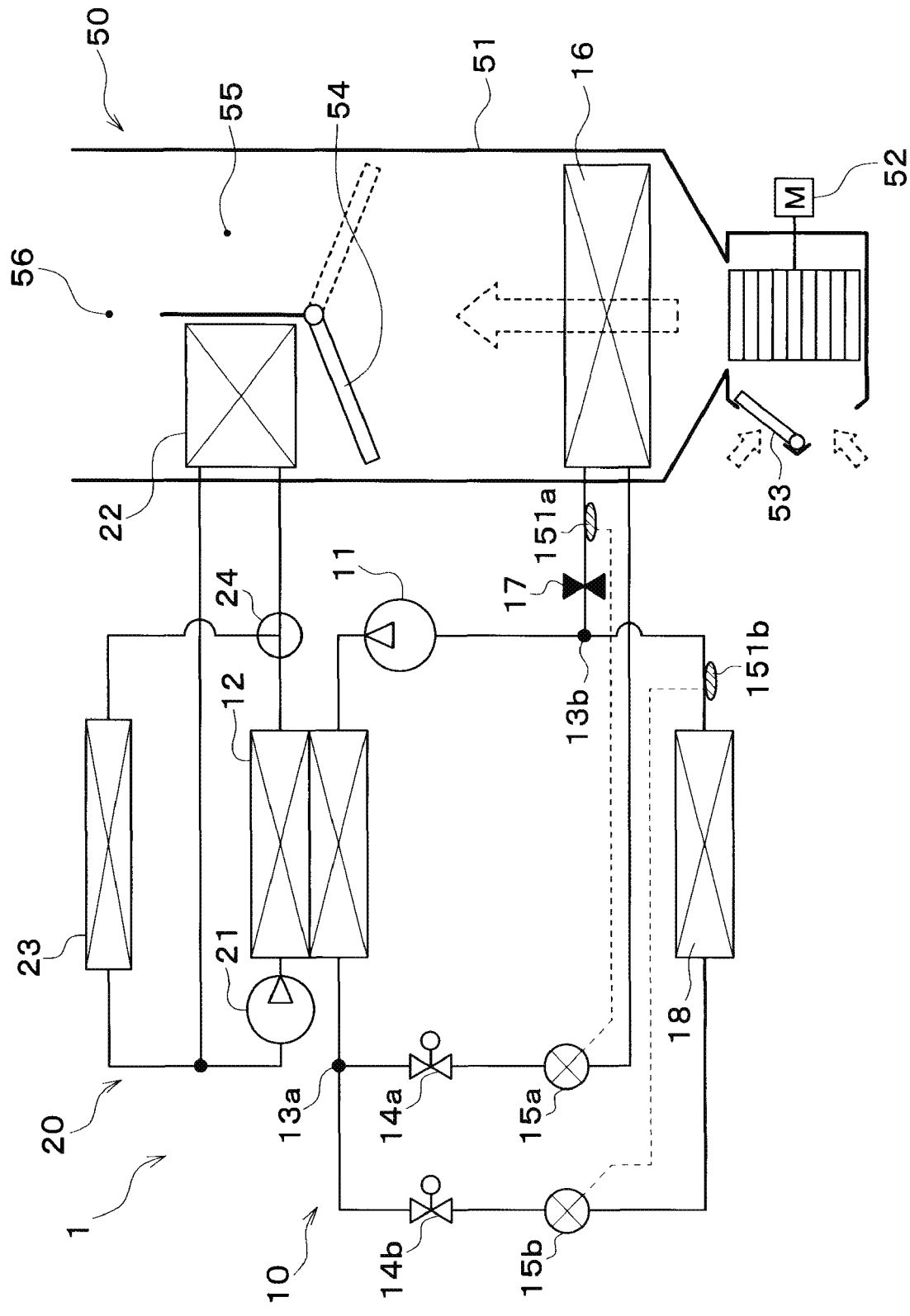
FIG. 1 is a configuration diagram of a vehicular air conditioner according to at least one embodiment.

A comparative example will be described. In the comparative example, A vapor compression type refrigeration cycle device is applied to a vehicular air conditioner. The refrigeration cycle device is configured to be capable of switching, for example, a refrigerant circuit in a cooling mode for cooling a ventilation air that is blown into a vehicle compartment, which is a space to be air conditioned, a refrigerant circuit in a heating mode for heating the ventilation air, and a refrigerant circuit in a dehumidification heating mode for reheating the ventilation air that has been cooled and dehumidified.

The refrigeration cycle device includes multiple heat exchangers such as an interior condenser, an exterior heat exchanger, and an interior evaporator. The interior condenser is a heat exchanger for exchanging heat between a high-pressure refrigerant discharged from the compressor and the ventilation air. The exterior heat exchanger is a heat exchanger for exchanging heat between a refrigerant and an outside air. The interior evaporator is a heat exchanger for exchanging heat between a low-pressure refrigerant whose pressure is reduced by a pressure reducing portion and the ventilation air.

In the cooling mode, the refrigeration cycle device switches to the refrigerant circuit in which the exterior heat exchanger functions as a radiator and the interior evaporator functions as an evaporator. In the heating mode, the refrigeration cycle device switches to the refrigerant circuit in which the interior condenser functions as a radiator and the exterior heat exchanger functions as an evaporator. In the dehumidification heating mode, the refrigeration cycle device switches to the refrigerant circuit in which the interior condenser functions as a radiator, and both the interior evaporator and the exterior heat exchanger function as evaporators.

In the comparative example, a cycle configuration is likely to be complicated because the refrigeration cycle device includes multiple heat exchangers and switches, according to an operation mode, between a refrigerant circuit in which a high-pressure refrigerant flows into a heat exchanger to function as a radiator and a refrigerant circuit in which a low-pressure refrigerant flows into the same heat exchanger to function as an evaporator.

Further, in the refrigeration cycle device configured to be capable of switching the operation mode, a state of the refrigerant on an outlet side of the heat exchanger functioning as the evaporator has to be appropriately adjusted in accordance with the operation mode.

More specifically, for example, in the cooling mode, it is preferable to adjust the refrigerant on the outlet side of the heat exchanger functioning as an evaporator so as to be in the gas-phase state so that the ventilation air can be efficiently cooled by a latent heat of evaporation of the refrigerant.

In addition, in the heating mode, since the refrigerant evaporating pressure in the heat exchanger functioning as an evaporator is lowered and the flow rate of circulating refrigerant circulating in the cycle is reduced, a refrigerator oil tends to stagnate in the exterior heat exchanger, rather than in the cooling mode. For that reason, in the heating mode, it is preferable to adjust the refrigerant on the outlet side of the exterior heat exchanger so as to be in the gas-liquid two-phase state.

For that reason, in the refrigeration cycle device of the comparative example capable of switching the operation mode, not only the cycle configuration is likely to be complicated, but also a control mode of the pressure reducing portion disposed on the upstream side of the refrigerant flow of the heat exchanger functioning as the evaporator is likely to be complicated.

In contrast, the present disclosure can provide a refrigeration cycle device including multiple evaporators and configured to be capable of switching an operation mode, which is capable of appropriately adjusting a state of refrigerant on an outlet side of each evaporator without complicating a cycle configuration.

According to a first aspect of the present disclosure, a refrigeration cycle device for an air conditioner includes: a compressor that compresses and discharges a refrigerant mixed with a refrigerator oil; a heat exchanger that heats a ventilation air by using a heat of the refrigerant discharged from the compressor as a heat source; a branch passage that branches a flow of a high-pressure refrigerant flowing out from the heat exchanger; a cooling valve that reduces a pressure of the refrigerant flowing out from one refrigerant outflow port of the branch passage; a cooling evaporator that evaporates the refrigerant by heat exchange between the refrigerant reduced in pressure by the cooling valve and the ventilation air; a heat absorption valve that reduces a pressure of the refrigerant flowing out from another refrigerant outflow port of the branch passage; a heat absorption evaporator that evaporates the refrigerant by heat exchange between the refrigerant reduced in pressure by the heat absorption valve and a heat source fluid; and a circuit switching valve that switches between a refrigerant circuit allowing the refrigerant to flow into the cooling evaporator and a refrigerant circuit preventing the refrigerant from flowing into the cooling evaporator. The heat absorption valve adjusts a throttle opening degree to cause a heat-absorption refrigerant on an outlet side of the heat absorption evaporator to be in a gas-liquid two-phase state when the circuit switching valve is switched to the refrigerant circuit that prevents the refrigerant from flowing into the cooling evaporator and a predetermined condition is satisfied.

According to the above configuration, since the circuit switching valve is provided, the refrigerant circuit can be switched. Specifically, the refrigerant circuit can be switched to the refrigerant circuit of the operation mode in which the refrigerant flows into the cooling evaporator and the ventilation air is cooled by the cooling evaporator. Further, the refrigerant circuit can be switched to the refrigerant circuit of the operation mode in which the refrigerant flows into the heat absorption evaporator without flowing into the cooling evaporator, and the heat absorbed from the heat source fluid in the heat absorption evaporator can be used as a heat source to heat the ventilation air in the heat exchanger.

Since the high-pressure refrigerant does not need to flow into the cooling evaporator or the heat absorption evaporator even if the refrigerant circuit is switched to any of the refrigerant circuits, the refrigerant circuit can be switched with a simple configuration without complicating the cycle configuration.

Further, when the circuit switching valve is switched to the refrigerant circuit that prevents the refrigerant from flowing into the cooling evaporator as in the operation mode of heating the ventilation air, and a predetermined condition is satisfied, the throttle opening degree of the heat absorption valve is adjusted so that the heat absorbing refrigerant is in the gas-liquid two-phase state. Therefore, even in the operation mode in which the flow rate of the circulating refrigerant circulating in the cycle is likely to decrease, such as the operation mode in which the ventilation air is heated, stagnation of the refrigerator oil can be in the heat absorption evaporator can be reduced.

Further, when the circuit switching valve is switched to the refrigerant circuit that allows the refrigerant to flow into the cooling evaporator, the cooling valve can appropriately adjust the state of the refrigerant flowing out from the cooling evaporator so that the ventilation air can be efficiently cooled by the cooling evaporator regardless of the throttle opening degree of the heat absorption valve.

In other words, according to the above aspect, a refrigeration cycle device can be provided, which is capable of appropriately adjusting the state of the refrigerant on the outlet side of the cooling evaporator and the heat absorption evaporator without complicating the cycle configuration.

According to a second aspect of the present disclosure, a refrigeration cycle device for an air conditioner includes: a compressor that compresses and discharges a refrigerant mixed with a refrigerator oil; a heat exchanger that heats a ventilation air by using a heat of the refrigerant discharged from the compressor as a heat source; a branch passage that branches a flow of a high-pressure refrigerant flowing out from the heat exchanger; a cooling valve that reduces a pressure of the refrigerant flowing out from one refrigerant outflow port of the branch passage; a cooling evaporator that evaporates the refrigerant by heat exchange between the refrigerant reduced in pressure by the cooling valve and the ventilation air; a heat absorption valve that reduces a pressure of the refrigerant flowing out from another refrigerant outflow port of the branch passage; a heat absorption evaporator that evaporates the refrigerant by heat exchange between the refrigerant reduced in pressure by the heat absorption valve and a heat source fluid; an internal heat exchanger that exchanges heat between the high-pressure refrigerant and a low-pressure refrigerant flowing out from the heat absorption evaporator; and a circuit switching valve that switches between a refrigerant circuit allowing the refrigerant to flow into the cooling evaporator and a refrigerant circuit preventing the refrigerant from flowing into the cooling evaporator. The heat absorption valve adjusts a throttle opening degree to cause the low-pressure refrigerant on an outlet side of the internal heat exchanger to be in a gas-liquid two-phase state when the circuit switching valve is switched to the refrigerant circuit that prevents the refrigerant from flowing into the cooling evaporator and a predetermined condition is satisfied.

According to the above configuration, similarly to the first embodiment, the refrigerant circuit in the operation mode for cooling the ventilation air and the refrigerant circuit in the operation mode for heating the ventilation air can be switched to each other with a simple configuration without complicating the cycle configuration.

Further, when the circuit switching valve is switched to the refrigerant circuit which prevents the refrigerant from flowing into the cooling evaporator as in the operation mode for heating the ventilation air, and a predetermined condition is satisfied, the throttle opening degree of the heat absorption valve is adjusted so that the low-pressure refrigerant on the outlet side of the internal heat exchanger is in the gas-liquid two-phase state. Therefore, even in the operation mode in which the flow rate of the circulating refrigerant circulating in the cycle is likely to decrease as in the operation mode in which the ventilation air is heated, stagnation of the refrigerator oil in the heat absorption evaporator and the internal heat exchanger can be reduced.

Further, when the circuit switching valve is switched to the refrigerant circuit that allows the refrigerant to flow into the cooling evaporator, the cooling valve can appropriately adjust the state of the refrigerant that has flowed out from the cooling evaporator so that the ventilation air can be efficiently cooled by the cooling evaporator regardless of the throttle opening degree of the heat absorption valve.

In addition, since the internal heat exchanger is provided, the enthalpy of the refrigerant flowing into the cooling evaporator or the heat absorption evaporator can be lowered. Therefore, the coefficient of performance of the refrigeration cycle device can be improved.

In other words, according to the above aspect, a refrigeration cycle device can be provided which is capable of appropriately adjusting the state of the refrigerant on the outlet side of the cooling evaporator and the heat absorption evaporator without complicating the cycle configuration.

According to a third aspect of the present disclosure, a refrigeration cycle device for an air conditioner includes: a compressor that compresses and discharges a refrigerant mixed with a refrigerator oil; a heat exchanger that heats a ventilation air by using a heat of the refrigerant discharged from the compressor as a heat source; a branch passage that branches a flow of a high-pressure refrigerant flowing out from the heat exchanger; a cooling valve that reduces a pressure of the refrigerant flowing out from one refrigerant outflow port of the branch passage; a cooling evaporator that evaporates the refrigerant by heat exchange between the refrigerant reduced in pressure by the cooling valve and the ventilation air; a heat absorption valve that reduces a pressure of the refrigerant flowing out from another refrigerant outflow port of the branch passage; a heat absorption evaporator that evaporates the refrigerant by heat exchange between the refrigerant reduced in pressure by the heat absorption valve and a heat source fluid; and a circuit switching valve that switches between a refrigerant circuit allowing the refrigerant to flow into the cooling evaporator and a refrigerant circuit preventing the refrigerant from flowing into the cooling evaporator. The cooling valve changes a throttle opening degree such that a line showing a change in cooling pressure of the cooling refrigerant, which corresponds to a change in cooling temperature of the cooling refrigerant on an outlet side of the cooling evaporator, approaches a predetermined cooling characteristic line. The heat absorption valve changes a throttle opening degree such that a line showing a change in heat absorption pressure of the heat absorbing refrigerant, which corresponds to a change in heat absorption temperature of the heat absorbing refrigerant on an outlet side of the heat absorption evaporator, approaches a predetermined heat absorption characteristic line. The cooling characteristic line and the heat absorption characteristic line are different from each other. In a range where the cooling temperature and the heat absorption temperature are lower than a predetermined reference temperature, the heat absorption pressure is higher than the cooling pressure and a saturated pressure of the refrigerant.

According to the above configuration, similarly to the first embodiment, the refrigerant circuit in the operation mode for cooling the ventilation air and the refrigerant circuit in the operation mode for heating the ventilation air can be switched to each other with a simple configuration without complicating the cycle configuration.

Further, since the cooling characteristic line and the heat absorption characteristic line are different from each other, the state of the cooling refrigerant and the state of the heat absorbing refrigerant can be adjusted to appropriate states.

Specifically, in the operation mode in which the ventilation air is heated, the heat absorption pressure can be set to a value higher than the saturated pressure of the refrigerant by setting the heat absorption temperature to be lower than a predetermined reference temperature. In other words, in the operation mode in which the ventilation air is heated, the heat absorbing refrigerant can be brought in a gas-liquid two-phase state.

Therefore, even in the operation mode in which the flow rate of the circulating refrigerant circulating in the cycle is likely to decrease, such as the operation mode in which the ventilation air is heated, stagnation of the refrigerator oil in the heat absorption evaporator can be reduced.

Further, in the operation mode for cooling the ventilation air, the cooling valve can appropriately adjust the state of the refrigerant flowing out from the cooling evaporator so that the ventilation air can be efficiently cooled by the cooling evaporator regardless of the throttle opening degree of the heat absorption valve.

In other words, according to the above aspect, a refrigeration cycle device can be provided which is capable of appropriately adjusting the state of the refrigerant on the outlet side of the cooling evaporator and the heat absorption evaporator without complicating the cycle configuration.

According to a fourth aspect of the present disclosure, a refrigeration cycle device for an air conditioner includes: a compressor that compresses and discharges a refrigerant mixed with a refrigerator oil; a heat exchanger that heats a ventilation air by using a heat of the refrigerant discharged from the compressor as a heat source; a branch passage that branches a flow of a high-pressure refrigerant flowing out from the heat exchanger; a cooling valve that reduces a pressure of the refrigerant flowing out from one refrigerant outflow port of the branch passage; a cooling evaporator that evaporates the refrigerant by heat exchange between the refrigerant reduced in pressure by the cooling valve and the ventilation air; a heat absorption valve that reduces a pressure of the refrigerant flowing out from another refrigerant outflow port of the branch passage; a heat absorption evaporator that evaporates the refrigerant by heat exchange between the refrigerant reduced in pressure by the heat absorption valve and a heat source fluid; an internal heat exchanger that exchanges heat between the high-pressure refrigerant and a low-pressure refrigerant flowing out from the heat absorption evaporator; and a circuit switching valve that switches between a refrigerant circuit allowing the refrigerant to flow into the cooling evaporator and a refrigerant circuit preventing the refrigerant from flowing into the cooling evaporator. The cooling valve changes a throttle opening degree such that a line showing a change in cooling pressure of the cooling refrigerant, which corresponds to a change in cooling temperature of the cooling refrigerant on an outlet side of the cooling evaporator, approaches a predetermined cooling characteristic line. The heat absorption valve changes the throttle opening degree such that a line showing a change in low-pressure pressure of the low-pressure refrigerant, which corresponds to a change in low-pressure temperature of the low-pressure refrigerant on the outlet side of the internal heat exchanger, approaches a predetermined low-pressure characteristic line. The cooling characteristic line and the low-pressure characteristic line are different from each other. In a range where the cooling temperature and the low-pressure temperature are lower than a predetermined reference temperature, the low-pressure pressure is higher than the cooling pressure and a saturated pressure of the refrigerant.

According to the above configuration, similarly to the first embodiment, the refrigerant circuit in the operation mode for cooling the ventilation air and the refrigerant circuit in the operation mode for heating the ventilation air can be switched to each other with a simple configuration without complicating the cycle configuration.

Further, since the cooling characteristic line and the low-pressure characteristic line are different from each other, the state of the cooling refrigerant and the state of the low-pressure refrigerant can be each adjusted to an appropriate state.

Specifically, in the operation mode in which the ventilation air is heated, the low-pressure pressure can be set to a value higher than the saturated pressure of the refrigerant by setting the low-pressure temperature to be lower than a predetermined reference temperature. In other words, in the operation mode in which the ventilation air is heated, the low-pressure refrigerant can be brought in a gas-liquid two-phase state.

Therefore, even in the operation mode in which the flow rate of the circulating refrigerant circulating in the cycle is likely to decrease as in the operation mode in which the ventilation air is heated, stagnation of the refrigerator oil in the heat absorption evaporator and the internal heat exchanger can be reduced.

Further, in the operation mode for cooling the ventilation air, the cooling valve can appropriately adjust the state of the refrigerant flowing out from the cooling evaporator so that the ventilation air can be efficiently cooled by the cooling evaporator regardless of the throttle opening degree of the heat absorption valve.

In addition, since the internal heat exchanger is provided, the enthalpy of the refrigerant flowing into the cooling evaporator or the heat absorption evaporator can be lowered. Therefore, the coefficient of performance of the refrigeration cycle device can be improved.

In other words, according to the above aspect of the present disclosure, a refrigeration cycle device can be provided which is capable of appropriately adjusting the state of the refrigerant on the outlet side of the cooling evaporator and the heat absorption evaporator without complicating the cycle configuration.

In this example, the refrigerant on the outlet side of each heat exchanger, such as the cooling evaporator, the heat absorption evaporator, and the internal heat exchanger, does not mean the refrigerant only at the time of passing through the refrigerant outlet of each heat exchanger. The refrigerant on the outlet side of each heat exchanger includes the refrigerant immediately before flowing out from the refrigerant outlet of each heat exchanger and the refrigerant immediately after flowing out from the refrigerant outlet of each heat exchanger.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

A first embodiment of the present disclosure will be described with reference to FIGS. 1 to 3. A refrigeration cycle device 10 according to the present embodiment is applied to a vehicular air conditioner 1 mounted on an electric vehicle which obtains a driving force for a vehicle travel from a traveling electric motor. In the vehicular air conditioner 1, the refrigeration cycle device 10 performs a function of adjusting a temperature of a ventilation air that is blown into a vehicle compartment, which is a space to be air conditioned.

In the vehicular air conditioner 1, operation in a cooling mode, operation in a heating mode, and operation in a dehumidification heating mode can be switched to each other. The cooling mode is an operation mode in which the ventilation air is cooled to cool the vehicle compartment. The heating mode is an operation mode in which the ventilation air is heated to heat the vehicle compartment. The dehumidification heating mode is an operation mode in which the cooled and dehumidified ventilation air is reheated to dehumidify and heat the vehicle compartment. Further, the refrigeration cycle device 10 can switch the refrigerant circuit to another according to each operation mode.

The refrigeration cycle device 10 employs an HFC-based refrigerant (specifically, R134a) as the refrigerant, and configures a subcritical refrigeration cycle in which a high-pressure refrigerant pressure does not exceed a critical pressure of the refrigerant. A refrigerator oil for lubricating a compressor 11 is mixed in the refrigerant. As the refrigerator oil, PAG oil (polyalkylene glycol oil) having compatibility with a liquid-phase refrigerant is employed. Part of the refrigerator oil circulates in the cycle together with the refrigerant.

First, each of component devices configuring the refrigeration cycle device 10 will be described with reference to the overall configuration diagram of FIG. 1.

The compressor 11 draws, compresses, and discharges the refrigerant in the refrigeration cycle device 10. The compressor 11 is disposed in a vehicle engine hood. The compressor 11 is an electric compressor that rotationally drives a fixed capacity type compression mechanism having a fixed discharge capacity by an electric motor. The number of revolutions (that is, the refrigerant discharge capacity) of the compressor 11 is controlled according to a control signal output from an air-conditioning control device 60 which will be described later.

An inlet side of a refrigerant passage of a high-temperature water-refrigerant heat exchanger 12 is connected to a discharge port of the compressor 11. The high-temperature water-refrigerant heat exchanger 12 is a heat exchanger for heating a high-temperature heat medium by exchanging a heat between the high-pressure refrigerant discharged from the compressor 11 and the high-temperature heat medium circulating in a high-temperature heat medium circuit 20. As the high-temperature heat medium, a solution containing ethylene glycol, an antifreeze solution, or the like can be employed.

In this example, the high-temperature heat medium circuit 20 is a high-temperature water circuit that circulates the high-temperature heat medium. In the high-temperature heat medium circuit 20, a water passage of the high-temperature water-refrigerant heat exchanger 12, a high-temperature heat medium pump 21, a heater core 22, a high-temperature radiator 23, a high-temperature flow rate regulation valve 24, and the like are disposed.

The high-temperature heat medium pump 21 is a high-temperature water pump that pumps the high-temperature heat medium to the inlet side of the water passage of the high-temperature water-refrigerant heat exchanger 12 in the high-temperature heat medium circuit 20. The high-temperature heat medium pump 21 is an electric pump in which a rotational speed (that is, a water pumping capacity) is controlled by a control voltage output from the air-conditioning control device 60.

The heater core 22 is disposed in a casing 51 of an interior air conditioning unit 50, which will be described later. The heater core 22 is a heat exchanger that heats the ventilation air by exchanging a heat between the high-temperature heat medium heated by the high-temperature water-refrigerant heat exchanger 12 and the ventilation air that has passed through an interior evaporator 16, which will be described later.

The high-temperature radiator 23 is a heat exchanger that exchanges a heat between the high-temperature heat medium heated by the high-temperature water-refrigerant heat exchanger 12 and an outside air blown from an outside air fan (not shown), and radiates a heat of the high-temperature heat medium to the outside air. The high-temperature radiator 23 is disposed on a front side in the vehicle engine hood. For that reason, when the vehicle is traveling, a traveling wind can be applied to the high-temperature radiator 23.

The high-temperature radiator 23 may be formed integrally with the high-temperature water-refrigerant heat exchanger 12 and the like. As shown in FIG. 1, the heater core 22 and the high-temperature radiator 23 are connected in parallel to a flow of the high-temperature heat medium in the high-temperature heat medium circuit 20.

The high-temperature flow rate regulation valve 24 is an electric three-way flow rate regulation valve for continuously regulating a high-temperature flow rate ratio between a flow rate of the high-temperature heat medium flowing into the heater core 22 and a flow rate of the high-temperature heat medium flowing into the high-temperature radiator 23 in the high-temperature heat media flowing out from the water passage of the high-temperature water-refrigerant heat exchanger 12. The operation of the high-temperature flow rate regulation valve 24 is controlled according to a control signal output from the air-conditioning control device 60.

The high-temperature flow rate regulation valve 24 is disposed at a connection portion between the heat medium inlet side of the heater core 22 and the heat medium inlet side of the high-temperature radiator 23. More specifically, the outlet of the water passage of the high-temperature water-refrigerant heat exchanger 12 is connected to the inlet side of the high-temperature flow rate regulation valve 24. The heat medium inlet side of the heater core 22 is connected to one outlet of the high-temperature flow rate regulation valve 24. The other outlet of the high-temperature flow rate regulation valve 24 is connected to the heat medium inlet side of the high-temperature radiator 23.

Therefore, in the high-temperature heat medium circuit 20, when the high-temperature flow rate regulation valve 24 adjusts the high-temperature flow rate ratio, the flow rate of the high-temperature heat medium flowing into the heater core 22 changes. As a result, the heat radiation amount of the high-temperature heat medium in the heater core 22 to the ventilation air, that is, the amount of heating of the ventilation air in the heater core 22 is adjusted.

In other words, in the present embodiment, the high-temperature heat medium pump 21, the high-temperature water-refrigerant heat exchanger 12, the heater core 22, the high-temperature radiator 23, the high-temperature flow rate regulation valve 24, and the like, which are disposed in the high-temperature heat medium circuit 20, configure a heating unit that heats the ventilation air with the use of the refrigerant discharged from the compressor 11 as a heat source.

Next, a refrigerant inflow port side of a branch portion 13a (e.g., branch passage) is connected to an outlet of the refrigerant passage of the high-temperature water-refrigerant heat exchanger 12. The branch portion 13a branches a flow of the high-pressure refrigerant flowing out from the refrigerant passage of the high-temperature water-refrigerant heat exchanger 12. The branch portion 13a has a multiple-way joint structure, for example, a three-way joint structure having three refrigerant inflow and outflow ports communicating with each other, and one of the three inflow and outflow ports is a refrigerant inflow port, and the other two are refrigerant outflow ports.

A refrigerant inlet side of the interior evaporator 16 is connected to one refrigerant outflow port of the branch portion 13a through a cooling open-close valve 14a and a cooling expansion valve 15a. A refrigerant inlet side of an exterior evaporator 18 is connected to the other refrigerant outflow port of the branch portion 13a through a heat absorbing open-close valve 14b and a heat absorption expansion valve 15b.

The cooling open-close valve 14a is an electromagnetic valve that opens and closes a refrigerant passage from one refrigerant outflow port of the branch portion 13a to an inlet of the cooling expansion valve 15a. The opening and closing operation of the cooling open-close valve 14a is controlled according to a control voltage output from the air-conditioning control device 60. The cooling open-close valve 14a configures a circuit switching valve for switching between a refrigerant circuit for causing the refrigerant to flow into the interior evaporator 16 and a refrigerant circuit that does not allow the refrigerant to flow into the interior evaporator 16 by opening and closing the refrigerant passage.

The cooling expansion valve 15a is a cooling pressure reducing portion that reduces a pressure of the refrigerant flowing out from one refrigerant outflow port of the branch portion 13a at least in the cooling mode and the dehumidification heating mode. Further, the cooling expansion valve 15a is a cooling flow rate adjustment unit for adjusting a flow rate of the refrigerant flowing into the interior evaporator 16.

In the present embodiment, as the cooling expansion valve 15a, a thermal expansion valve is employed which changes the throttle opening degree by a mechanical mechanism in accordance with a temperature and a pressure of the refrigerant on the outlet side of the interior evaporator 16 (in the present embodiment, the refrigerant flowing out from the interior evaporator 16).

More specifically, the cooling expansion valve 15a has a temperature sensing unit 151a for sensing the temperature and the pressure of the refrigerant on the outlet side of the interior evaporator 16. The temperature sensing unit 151a includes an enclosure space formation member that defines an enclosure space in which a temperature sensitive medium is sealed, a diaphragm or the like which is a pressure responsive member deformed in accordance with a pressure difference between the pressure of the temperature sensitive medium and the pressure of the refrigerant on the outlet side of the interior evaporator 16, and the like.

The temperature sensitive medium is a medium whose pressure changes in accordance with the temperature of the refrigerant on the outlet side of the interior evaporator 16. In the cooling expansion valve 15a, the throttle opening degree is changed by transmitting the displacement of the diaphragm to the valve body which changes a passage cross-sectional area of a throttle passage. The throttle opening degree characteristic of the cooling expansion valve 15a will be described later.

The refrigerant inlet side of the interior evaporator 16 is connected to an outlet of the cooling expansion valve 15a. The interior evaporator 16 is a cooling evaporator that evaporates the low-pressure refrigerant by exchanging a heat between the low-pressure refrigerant reduced in pressure by the cooling expansion valve 15a and the ventilation air to cool the ventilation air at least in the cooling mode and the dehumidification heating mode. The interior evaporator 16 is disposed in the casing 51 of the interior air conditioning unit 50.

An inlet side of an evaporation pressure regulation valve 17 is connected to a refrigerant outlet of the interior evaporator 16. The evaporation pressure regulation valve 17 is an evaporation pressure adjustment unit that maintains a refrigerant evaporating pressure in the interior evaporator 16 at a predetermined reference pressure or higher. The evaporation pressure regulation valve 17 includes a mechanical variable throttle mechanism that increases the valve opening degree as the refrigerant pressure on the outlet side of the interior evaporator 16 increases.

In the present embodiment, as the evaporation pressure regulation valve 17, a valve that maintains the refrigerant evaporation temperature in the interior evaporator 16 at a frost inhibition reference temperature (1° C. in the present embodiment) or more capable of inhibiting frosting of the interior evaporator 16 is employed.

One refrigerant inflow port side of a merging portion 13b is connected to an outlet of the evaporation pressure regulation valve 17. The merging portion 13b merges a flow of the refrigerant flowing out from the evaporation pressure regulation valve 17 and a flow of the refrigerant flowing out from the exterior evaporator 18. The merging portion 13b has a three-way joint structure similar to that of the branch portion 13a, and two of the three inflow and outflow ports are used as refrigerant inflow ports, and the remaining one is used as a refrigerant outflow port.

The heat absorbing open-close valve 14b is an electromagnetic valve that opens and closes a refrigerant passage from the other refrigerant outflow port of the branch portion 13a to the inlet of the heat absorption expansion valve 15b. A basic configuration of the heat absorbing open-close valve 14b is the same as that of the cooling open-close valve 14a. The heat absorbing open-close valve 14b and the cooling open-close valve 14a configure a circuit switching valve.

The heat absorption expansion valve 15b is a heat absorption pressure reducing portion that reduces a pressure of the refrigerant flowing out from the other refrigerant outflow port of the branch portion 13a at least in the heating mode. Further, the heat absorption expansion valve 15b is a heat absorbing flow rate adjustment unit for adjusting a flow rate of the refrigerant flowing into the exterior evaporator 18.

In the present embodiment, as the heat absorption expansion valve 15b, a thermal expansion valve is employed which changes the throttle opening degree by a mechanical mechanism in accordance with the temperature and pressure of the refrigerant on the outlet side of the exterior evaporator 18 (in the present embodiment, the refrigerant flowing out from the exterior evaporator 18).

A basic configuration of the heat absorption expansion valve 15b is the same as that of the cooling expansion valve 15a. Therefore, the heat absorption expansion valve 15b has a temperature sensing unit 151b for sensing the temperature and pressure of the refrigerant on the outlet side of the exterior evaporator 18. The temperature sensitive medium enclosed in the temperature sensing unit 151b of the heat absorption expansion valve 15b is a medium whose pressure changes in accordance with the temperature of the refrigerant on the outlet side of the exterior evaporator 18. The throttle opening degree characteristic of the heat absorption expansion valve 15b will be described later.

The outlet of the heat absorption expansion valve 15b is connected to a refrigerant inlet side of the exterior evaporator 18. The exterior evaporator 18 is a heat absorption evaporator that exchanges a heat between the low-pressure refrigerant reduced in pressure by the heat absorption expansion valve 15b and the outside air blown from an outside air fan (not shown) at least in the heating mode and the dehumidification heating mode, and evaporates the low-pressure refrigerant to exert a heat absorbing action on the refrigerant. Therefore, the heat source fluid of the present embodiment is outside air.

The exterior evaporator 18 is disposed on a front side in the vehicle engine hood. The exterior evaporator 18 may be formed integrally with the high-temperature radiator 23 or the like. The other refrigerant inflow port side of the merging portion 13b is connected to the refrigerant outlet of the exterior evaporator 18. An intake port side of the compressor 11 is connected to the refrigerant outflow port of the merging portion 13b.

Next, the throttle opening degree characteristic of the cooling expansion valve 15a and the throttle opening degree characteristic of the heat absorption expansion valve 15b will be described with reference to FIG. 2.

First, the refrigerant on the outlet side of the interior evaporator 16 is defined as a cooling refrigerant, the temperature of the cooling refrigerant is defined as a cooling temperature T1, and the pressure of the cooling refrigerant is defined as a cooling pressure P1. At this time, the cooling expansion valve 15a according to the present embodiment changes the throttle opening degree so that a change in the cooling pressure P1 corresponding to a change in the cooling temperature T1 draws a cooling characteristic line CL1 indicated by a thick solid line in FIG. 2, more specifically, approaches the cooling characteristic line CL1.

Figure 2:
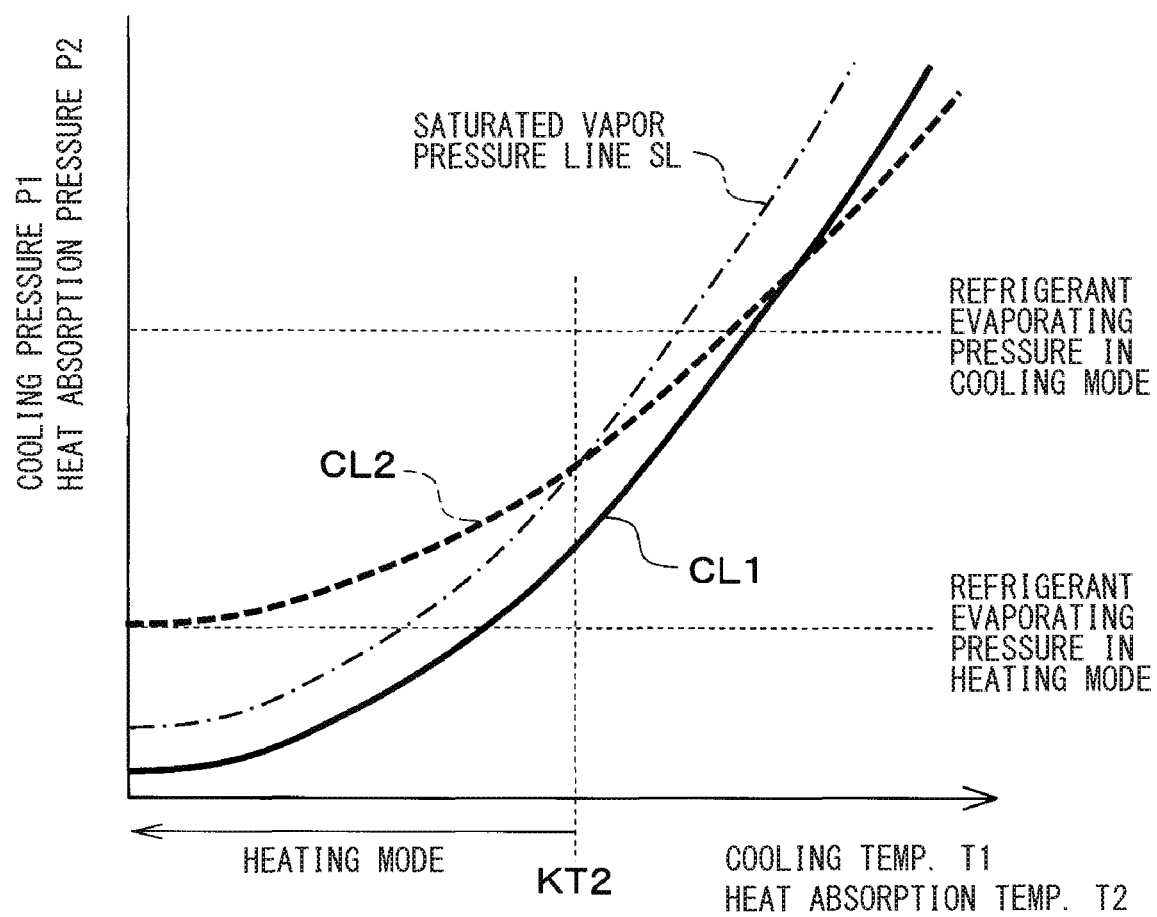
FIG. 2 is an illustrative diagram illustrating throttle opening degree characteristics of a cooling expansion valve and a heat absorption expansion valve according to at least one embodiment.

The cooling characteristic line CL1 according to the present embodiment is set to a line substantially parallel to a saturated vapor pressure line SL indicated by a fine one-dot chain line in FIG. 2. The saturated vapor pressure line SL is determined according to the physical properties of the refrigerant circulating in the cycle (in the present embodiment, R134a). Further, the cooling pressure P1 is set to a value lower than the saturated vapor pressure regardless of the cooling temperature T1.

For that reason, in the throttle opening degree characteristic of the cooling expansion valve 15a according to the present embodiment, the throttle opening degree is changed so that the cooling refrigerant is in a gas-phase state having the degree of superheat regardless of the cooling temperature T1. More specifically, in the throttle opening degree characteristic of the cooling expansion valve 15a, the throttle opening degree is changed so that the degree of superheat of the refrigerant on the outlet side of the interior evaporator 16 becomes approximately 3° C. during the normal operation of the cycle.

The throttle opening degree characteristic described above can be realized by adopting a medium whose main component is a refrigerant circulating in the cycle as a temperature sensitive medium sealed in the temperature sensing unit 151a of the cooling expansion valve 15a. In other words, the cooling expansion valve 15a can be realized by adopting a so-called normal charge type thermal expansion valve.

Further, the refrigerant on the outlet side of the exterior evaporator 18 is defined as a heat absorbing refrigerant, the temperature of the heat absorbing refrigerant is defined as a heat absorption temperature T2, and the pressure of the heat absorbing refrigerant is defined as a heat absorption pressure P2. At this time, the heat absorption expansion valve 15b according to the present embodiment changes the throttle opening degree so that a change in the heat absorption pressure P2 corresponding to a change in the heat absorption temperature T2 draws a heat absorption characteristic line CL2 indicated by a thick dashed line in FIG. 2, more specifically, approaches the heat absorption characteristic line CL2.

In this example, as is apparent from FIG. 2, the cooling characteristic line CL1 and the heat absorption characteristic line CL2 are different from each other. More specifically, in the present embodiment, a slope of the heat absorption characteristic line CL2 is smaller than a slope of the cooling characteristic line CL1.

As the slope of the cooling characteristic line CL1, a differential value of a mathematical expression expressing the cooling characteristic line CL1 as a function of the cooling pressure P1 as a function of the cooling temperature T1 can be adopted. As the slope of the heat absorption characteristic line CL2, a differential value of a mathematical expression expressing the cooling characteristic line CL1 can be adopted with the heat absorption pressure P2 as a function of the heat absorption temperature T2.

In ranges where the cooling temperature T1 and the heat absorption temperature T2 are lower than a predetermined reference temperature KT2, the heat absorption pressure P2 is higher than a saturated pressure determined by the cooling pressure P1 and a saturated vapor pressure line of the refrigerant.

For that reason, in the throttle opening degree characteristics of the heat absorption expansion valve 15b according to the present embodiment, the throttle opening degree is changed so that the heat absorbing refrigerant is in the gas-liquid two-phase condition within a range in which the heat absorption temperature T2 is lower than the reference temperature KT2. Further, in a range in which the heat absorption temperature T2 is higher than the reference temperature KT2, the throttle opening degree is changed so that the heat absorbing refrigerant is in a gas-phase state having the degree of superheating.

The throttle opening degree characteristic described above can be realized by employing, as the temperature sensitive medium enclosed in the temperature sensing unit 151b of the heat absorption expansion valve 15b, a medium in which an inert gas is mixed with a refrigerant having a component different from that of the refrigerant circulating in the cycle, or the like. In other words, the throttle opening characteristic can be realized by employing a so-called cross-charge type thermal expansion valve as the heat absorption expansion valve 15b.

Further, the reference temperature KT2 of the present embodiment is set to a value higher than a value that can be taken by the heat absorption temperature T2 when the operation in the heating mode is executed (specifically, 1° C.). For that reason, in the heating mode, the heat absorption expansion valve 15b changes the throttle opening degree so that the heat absorbing refrigerant flowing out from the exterior evaporator 18 is in the gas-liquid two-phase state.

In this example, the refrigerant on the outlet side of each evaporator does not mean only the refrigerant at the instant of passing through the refrigerant outlet of each evaporator, and the refrigerant on the outlet side of each evaporator includes the refrigerant immediately before flowing out from the refrigerant outlet of the interior evaporator 16 and the refrigerant immediately after flowing out from the refrigerant outlet of the interior evaporator 16.

Next, the interior air conditioning unit 50 will be described. The interior air conditioning unit 50 provides an air passage for blowing the ventilation air whose temperature has been adjusted by the refrigeration cycle device 10 to an appropriate place in the vehicle compartment in the vehicular air conditioner 1. The interior air conditioning unit 50 is disposed inside an instrument panel at the front of the vehicle compartment.

The interior air conditioning unit 50 accommodates a blower 52, the interior evaporator 16, the heater core 22, and the like in an air passage provided inside the casing 51 forming an outer shell of the interior air conditioning unit 50.

The casing 51 provides an air passage for the ventilation air to be blown into the vehicle compartment, and is formed of a resin having a certain degree of elasticity and excellent in strength (specifically, polypropylene). An inside-outside air switch device 53 is disposed on the most upstream side of the ventilation air flow in the casing 51. The inside-outside air switch device 53 switchingly introduces the inside air (vehicle interior air) and the outside air (vehicle exterior air) into the casing 51.

The inside-outside air switch device 53 can continuously adjust the opening areas of an inside air introduction port for introducing the inside air into the casing 51 and an outside air introduction port for introducing the outside air by an inside-outside air switch door to be able to change an introduction ratio of the introduction air volume of the inside air and the introduction air volume of the outside air. The inside-outside air switch door is driven by an electric actuator for the inside-outside air switch door. The operation of the electric actuator is controlled according to a control signal output from the air-conditioning control device 60.

The blower 52 is disposed on the downstream side of the inside-outside air switch device 53 in the ventilation air flow. The blower 52 functions to blow the air drawn in through the inside-outside air switch device 53 toward the vehicle compartment. The blower 52 is an electric blower that drives a centrifugal multi-blade fan with an electric motor. The number of revolutions (that is, the blowing capacity) of the blower 52 is controlled according to a control voltage output from the air-conditioning control device 60.

The interior evaporator 16 and the heater core 22 are disposed in a stated order on the ventilation air flow downstream side of the blower 52 in the flow of the ventilation air. In other words, the interior evaporator 16 is disposed on the upstream side of the heater core 22 in the ventilation air flow.

A cold air bypass passage 55 is provided in the casing 51 to allow the ventilation air passing through the interior evaporator 16 to flow to the downstream side while bypassing the heater core 22.

An air mixing door 54 is disposed on the ventilation air flow downstream side of the interior evaporator 16 and on the ventilation air flow upstream side of the heater core 22. The air mixing door 54 adjusts an air volume ratio between an air volume passing through the heater core 22 and an air volume passing through the cold air bypass passage 55 in the ventilation air that has passed through the interior evaporator 16.

The air mixing door 54 is driven by an electric actuator for driving the air mixing door. The operation of the electric actuator is controlled according to a control signal output from the air-conditioning control device 60.

A mixing space 56 for mixing the ventilation air heated by the heater core 22 and the ventilation air passing through the cold air bypass passage 55 and not heated by the heater core 22 is provided on the downstream side of the heater core 22 in the ventilation air flow. Further, opening holes for blowing the ventilation air (air conditioning wind) mixed in the mixing space into the vehicle compartment are disposed in the most downstream portion of the casing 51 in the ventilation air flow.

The opening holes include a face opening hole, a foot opening hole, and a defroster opening hole (all not shown). The face opening hole is an opening hole for blowing the air conditioning wind toward an upper body of an occupant in the vehicle compartment. The foot opening hole is an opening hole for blowing the air conditioning wind toward a foot of the occupant. The defroster opening hole is an opening hole for blowing the air conditioning wind toward an inner surface of a vehicle front window glass.

The face opening hole, the foot opening hole, and the defroster opening hole are respectively connected to a face blowing port, a foot blowing port, and a defroster blowing port (both, not shown) provided in the vehicle compartment through a duct defining an air passage.

Therefore, the air mixing door 54 adjusts an air volume ratio between an air volume passing through the heater core 22 and an air volume passing through the cold air bypass passage 55, thereby adjusting the temperature of the air conditioning wind mixed in the mixing space. As a result, the air mixing door 54 also adjusts the temperature of the ventilation air (air conditioning wind) blown from each of the blowing ports into the vehicle compartment.

A face door for adjusting the opening area of the face opening hole, a foot door for adjusting the opening area of the foot opening hole, and a defroster door (all not shown) for adjusting the opening area of the defroster opening hole are disposed on the upstream side of the face opening hole, the foot opening hole, and the defroster opening hole in the ventilation air flow, respectively.

The face door, the foot door, and the defroster door configure a blowing mode switching device for switching a blowing port through which the air conditioning wind is blown out to another. The face door, the foot door, and the defroster door are connected to an electric actuator for driving the blowing port mode door through a link mechanism or the like, and are rotationally operated in conjunction with each other. The operation of the electric actuator is controlled according to a control signal output from the air-conditioning control device 60.

Next, an outline of the electric control unit according to the present embodiment will be described with reference to FIG. 3. The air-conditioning control device 60 includes a well-known microcomputer including a CPU, a ROM, a RAM, and the like, and peripheral circuits of the microcomputer. The air-conditioning control device 60 performs various calculations and processes based on an air conditioning control program stored in the ROM, and controls the operations of the various control target devices 11, 14a, 14b, 21, 24, 52, and so on connected to an output of the air-conditioning control device 60.

Figure 3:
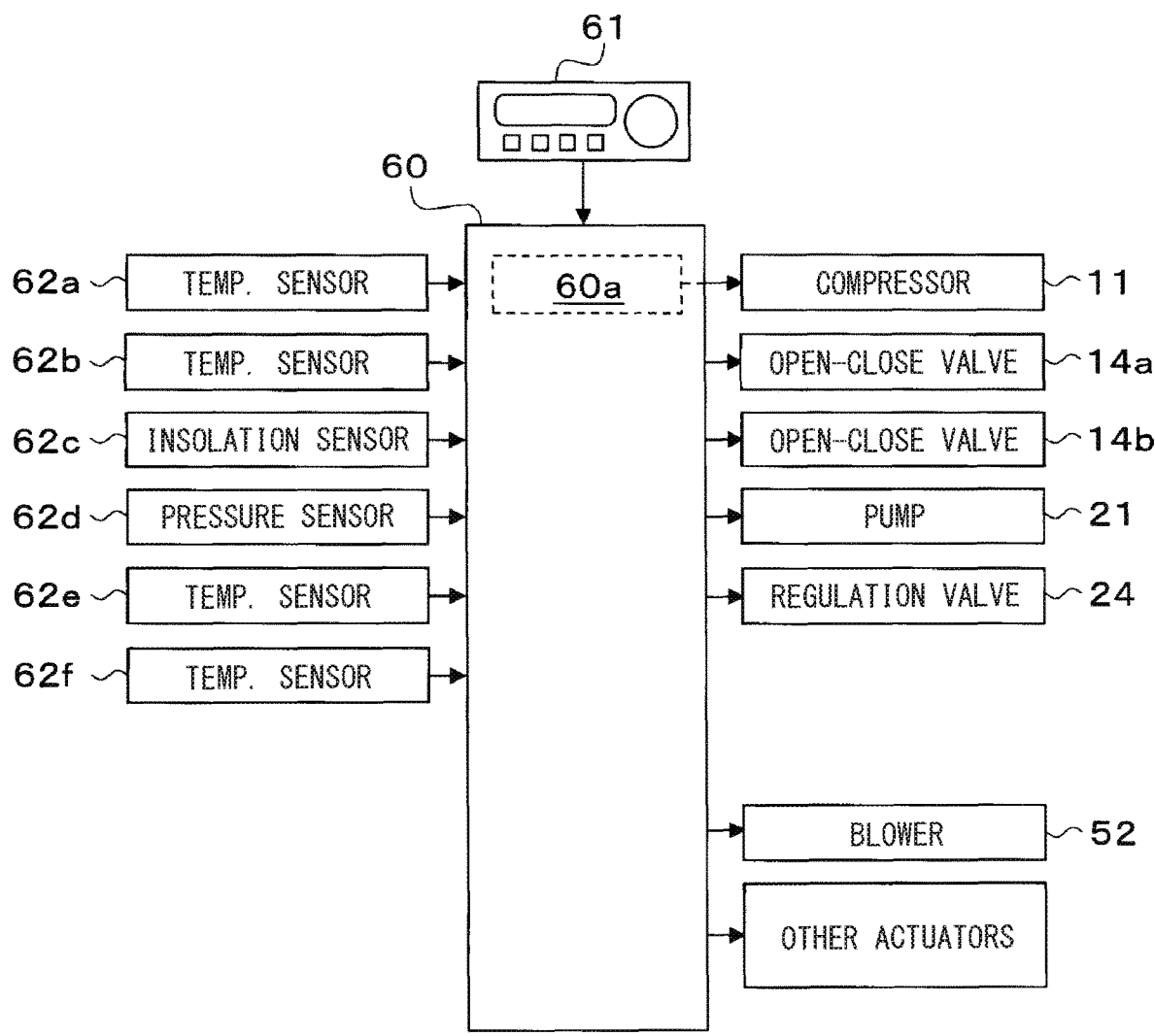
FIG. 3 is a block diagram showing an electric control unit of the vehicular air conditioner according to at least one embodiment.

As shown in a block diagram of FIG. 3, an input side of the air-conditioning control device 60 is connected with an air conditioning control sensor group, such as an inside air temperature sensor 62a, an outside air temperature sensor 62b, a insolation sensor 62c, a high-pressure sensor 62d, an evaporator temperature sensor 62e, and an air conditioning wind temperature sensor 62f. Detection signals of the air conditioning control sensor group are input to the air-conditioning control device 60.

The inside air temperature sensor 62a is an inside air temperature detection unit that detects a vehicle interior temperature (an inside air temperature) Tr. The outside air temperature sensor 62b is an outside air temperature detection unit that detects a vehicle exterior temperature (an outside air temperature) Tam. The insolation sensor 62c is an insolation amount detection unit that detects an insolation amount As irradiated into the vehicle compartment. The high-pressure sensor 62d is a refrigerant pressure detection unit that detects a high-pressure refrigerant pressure Pd of the refrigerant flow channel from a discharge port side of the compressor 11 to an inlet side of the cooling expansion valve 15a or the heat absorption expansion valve 15b.

The evaporator temperature sensor 62e is an evaporator temperature detection unit that detects a refrigerant evaporation temperature (evaporator temperature) Tefin in the interior evaporator 16. The air conditioning wind temperature sensor 62f is an air conditioning wind temperature detection unit that detects a ventilation air temperature TAV blown from a first mixing space 56a and a second mixing space 56b into the vehicle compartment.

Further, as shown in FIG. 3, an operation panel 61 disposed in the vicinity of the instrument panel in the front portion of the vehicle compartment is connected to the input side of the air-conditioning control device 60, and operation signals from various operation switches provided on the operation panel 61 are input to the operation panel 61.

Specific examples of the various operation switches provided on the operation panel 61 include an automatic switch for setting or canceling the automatic control operation of the vehicular air conditioner, a cooling switch for requesting the cooling of the vehicle compartment, an air volume setting switch for manually setting the air volume of the blower 52, and a temperature setting switch for setting a target temperature Tset in the vehicle compartment.

In the air-conditioning control device 60 according to the present embodiment, a control unit for controlling various control target devices, which is connected to the output side of the air-conditioning control device 60 is integrally configured, but a configuration for controlling the operation of each control target device (hardware and software) configures a control unit for controlling the operation of each control target device. For example, in the air-conditioning control device 60, a configuration for controlling the operation of the compressor 11 is a discharge capacity control unit 60*a*.

Next, the operation of the vehicular air conditioner 1 according to the present embodiment in the above configuration will be described. As described above, in the vehicular air conditioner 1 according to the present embodiment, the operation mode can be switched to another. The switching of those operation modes is performed by executing an air conditioning control program stored in advance in the air-conditioning control device 60.

More specifically, in the air conditioning control program, a target blowing temperature TAO of the ventilation air to be blown into the vehicle compartment is calculated based on the detection signal detected by the air conditioning control sensor group and the operation signal output from the operation panel 61. Then, the operation mode is switched to another based on the target blowing temperature TAO and the detection signal. The operation of each operation mode will be described below.

(a) Cooling Mode

In the cooling mode, the air-conditioning control device 60 opens the cooling open-close valve 14*a* and closes the heat absorbing open-close valve 14*b*.

Accordingly, in the refrigeration cycle device 10 in the cooling mode, a vapor compression type refrigeration cycle is configured in which the refrigerant circulates in the stated order of the compressor 11, the high-temperature water-refrigerant heat exchanger 12, the branch portion 13*a*, the cooling open-close valve 14*a*, the cooling expansion valve 15*a*, the interior evaporator 16, the evaporation pressure regulation valve 17, the merging portion 13*b*, and the compressor 11.

In other words, in the cooling mode, the refrigerant circuit is switched to a refrigerant circuit that allows the refrigerant to flow into the interior evaporator 16. In other words, in the cooling mode, the refrigerant circuit is switched to a refrigerant circuit that allows the refrigerant to flow into the cooling evaporator.

In the cycle configuration, the air-conditioning control device 60 controls the operation of various control target devices, which are connected to the output side of the air-conditioning control device 60.

For example, the air-conditioning control device 60 controls the operation of the compressor 11 so that the refrigerant evaporation temperature Tefin detected by the evaporator temperature sensor 62*e* reaches the target evaporation temperature TEO. The target evaporation temperature TEO is determined based on the target blowing temperature TAO with reference to a control map for the cooling mode stored in advance in the air-conditioning control device 60.

Specifically, in the control map, the target evaporation temperature TEO is increased with an increase in the target blowing temperature TAO so that the ventilation air temperature TAV detected by the air conditioning wind temperature sensor 62*f* approaches the target blowing temperature TAO. Further, the target evaporation temperature TEO is determined to be a value within a range in which frosting of the interior evaporator 16 can be inhibited (specifically, 1° C. or more).

In addition, the air-conditioning control device 60 operates the high-temperature heat medium pump 21 so as to exhibit a predetermined water pumping capability in the cooling mode. The air-conditioning control device 60 controls the operation of the high-temperature flow rate regulation valve 24 so that the entire flow rate of the high-temperature heat medium flowing out from the water passage of the high-temperature water-refrigerant heat exchanger 12 flows into the high-temperature radiator 23.

The air-conditioning control device 60 determines the control voltage of the blower 52 (the blowing capacity) based on the target blowing temperature TAO with reference to the control map stored in advance in the air-conditioning control device 60. More specifically, in the control map, the blowing amount of the blower 52 is maximized in a cryogenic range (maximum cooling range) and an extremely high temperature range (maximum heating range) of the target blowing temperature TAO, and the blowing air volume is decreased as the blowing amount approaches an intermediate temperature region.

The air-conditioning control device 60 controls the operation of the air mixing door 54 so that the cold air bypass passage 55 is fully opened to close an air flow passage on the heater core 22 side. In addition, the air-conditioning control device 60 controls the operation of other various control target devices as appropriate.

Therefore, in the refrigeration cycle device 10 in the cooling mode, the high-pressure refrigerant discharged from the compressor 11 flows into the high-temperature water-refrigerant heat exchanger 12. In the high-temperature water-refrigerant heat exchanger 12, since the high-temperature heat medium pump 21 is operating, the high-pressure refrigerant and the high-temperature heat medium exchange a heat with each other, the high-pressure refrigerant is cooled and condensed, and the high-temperature heat medium is heated.

In the high-temperature heat medium circuit 20, the high-temperature heat medium heated by the high-temperature water-refrigerant heat exchanger 12 flows into the high-temperature radiator 23 through the high-temperature flow rate regulation valve 24. The high-temperature heat medium flowing into the high-temperature radiator 23 exchanges a heat with the outside air to radiate the heat. As a result, the high-temperature heat medium is cooled. The high-temperature heat medium cooled by the high-temperature radiator 23 is drawn into the high-temperature heat medium pump 21 and is pumped to the water passage of the high-temperature water-refrigerant heat exchanger 12 again.

The high-pressure refrigerant cooled in the refrigerant passage of the high-temperature water-refrigerant heat exchanger 12 flows into the cooling expansion valve 15*a* through the branch portion 13*a* and the cooling open-close valve 14*a* and is reduced in pressure. At this time, the throttle opening degree of the cooling expansion valve 15*a* is adjusted so that the cooling pressure P1 with respect to the cooling temperature T1 approaches the cooling characteristic line CL1 shown in FIG. 2. In other words, the throttle opening degree of the cooling expansion valve 15*a* is adjusted so that the degree of superheating of the refrigerant on the outlet side of the interior evaporator 16 becomes approximately 3° C.

The low-pressure refrigerant reduced in pressure by the cooling expansion valve 15*a* flows into the interior evaporator 16. The refrigerant flowing into the interior evaporator 16 absorbs the heat from the ventilation air blown from the blower 52 and evaporates. As a result, the ventilation air is cooled. The refrigerant flowing out from the interior evaporator 16 is drawn into the compressor 11 through the evaporation pressure regulation valve 17 and the merging portion 13b and reduced in pressure again.

Therefore, in the cooling mode, the inside of the vehicle compartment can be cooled by blowing out the ventilation air cooled by the interior evaporator 16 into the vehicle compartment.

(b) Heating Mode

In the heating mode, the air-conditioning control device 60 closes the cooling open-close valve 14a and opens the heat absorbing open-close valve 14b.

Accordingly, in the refrigeration cycle device 10 in the heating mode, a vapor compression type refrigeration cycle is configured in which the refrigerant circulates in the order of the compressor 11, the high-temperature water-refrigerant heat exchanger 12, the branch portion 13a, the heat absorbing open-close valve 14b, the heat absorption expansion valve 15b, the exterior evaporator 18, the merging portion 13b, and the compressor 11.

In other words, in the heating mode, the refrigerant circuit is switched to a refrigerant circuit that does not allow the refrigerant to flow into the interior evaporator 16. In other words, the refrigerant circuit is switched to a refrigerant circuit in which the refrigerant is prohibited from flowing into the cooling evaporator.

In the cycle configuration, the air-conditioning control device 60 controls the operation of various control target devices, which are connected to the output side of the air-conditioning control device 60.

For example, the air-conditioning control device 60 controls the operation of the compressor 11 so that the high-pressure refrigerant pressure Pd detected by the high-pressure sensor 62d becomes a target high-pressure PCO. The target high-pressure PCO is determined based on the target blowing temperature TAO with reference to a control map for the heating mode stored in advance in the air-conditioning control device 60.

More specifically, in the control map, the target high pressure PCO is increased as the target blowing temperature TAO is increased so that the ventilation air temperature TAV approaches the target blowing temperature TAO.

In addition, the air-conditioning control device 60 operates the high-temperature heat medium pump 21 so as to exhibit a predetermined water pumping capability in the heating mode. The air-conditioning control device 60 controls the operation of the high-temperature flow rate regulation valve 24 so that the entire flow rate of the high-temperature heat medium flowing out from the water passage of the high-temperature water-refrigerant heat exchanger 12 flows into the heater core 22.

Similarly to the cooling mode, the air-conditioning control device 60 determines a control voltage of the blower 52 (the blowing capacity). The air-conditioning control device 60 controls the operation of the air mixing door 54 so that the air flow passage on the heater core 22 side is fully opened to close the cold air bypass passage 55. In addition, the air-conditioning control device 60 controls the operation of other various control target devices as appropriate.

Therefore, in the refrigeration cycle device 10 in the heating mode, the high-pressure refrigerant discharged from the compressor 11 flows into the high-temperature water-refrigerant heat exchanger 12. In the high-temperature water-refrigerant heat exchanger 12, since the high-temperature heat medium pump 21 is operating, the high-pressure refrigerant and the high-temperature heat medium exchange a heat with each other, the high-pressure refrigerant is cooled and condensed, and the high-temperature heat medium is heated.

In the high-temperature heat medium circuit 20, the high-temperature heat medium heated by the high-temperature water-refrigerant heat exchanger 12 flows into the heater core 22 through the high-temperature flow rate regulation valve 24. Since the air mixing door 54 fully opens the air flow passage on the heater core 22 side, the high-temperature heat medium flowing into the heater core 22 exchanges a heat with the ventilation air passing through the interior evaporator 16 to radiate the heat.

As a result, the ventilation air is heated, and the temperature of the ventilation air approaches the target blowing temperature TAO. The high-temperature heat medium flowing out from the heater core 22 is drawn into the high-temperature heat medium pump 21 and is pumped to the water passage of the high-temperature water-refrigerant heat exchanger 12 again.

The high-pressure refrigerant flowing out from the refrigerant passage of the high-temperature water-refrigerant heat exchanger 12 flows into the heat absorption expansion valve 15b through the branch portion 13a and the heat absorbing open-close valve 14b and is reduced in pressure. At this time, the throttle opening degree of the heat absorption expansion valve 15b is adjusted so that the heat absorption pressure P2 with respect to the heat absorption temperature T2 approaches the heat absorption characteristic line CL2 shown in FIG. 2.

As described above, in the heat absorption characteristic line CL2, the heat absorption temperature T2 when the heating mode is operated is lower than the reference temperature KT2. For that reason, the heat absorption pressure P2 becomes higher than a saturated pressure of the refrigerant. In other words, the throttle opening degree of the heat absorption expansion valve 15b is adjusted so that the refrigerant on the outlet side of the exterior evaporator 18 is in the gas-liquid two-phase state.

The low-pressure refrigerant reduced in pressure by the heat absorption expansion valve 15b flows into the exterior evaporator 18. The refrigerant flowing into the exterior evaporator 18 absorbs a heat from the outside air, which is the heat source fluid blown from the outside air fan, and evaporates. The refrigerant flowing out from the exterior evaporator 18 is drawn into the compressor 11 through the merging portion 13b and compressed again.

Therefore, in the heating mode, the vehicle compartment can be heated by blowing out the ventilation air heated by the heater core 22 into vehicle compartment. The heating mode is an operation mode in which the refrigerant circuit is switched to a refrigerant circuit which does not allow the refrigerant to flow into the interior evaporator 16, and a predetermined condition that the heat absorption temperature T2 is lower than the reference temperature KT2 is satisfied.

(c) Dehumidification Heating Mode

In the dehumidification heating mode, the air-conditioning control device 60 opens the cooling open-close valve 14a and opens the heat absorbing open-close valve 14b.

Accordingly, in the refrigeration cycle device 10 in the dehumidification heating mode, a vapor compression type refrigeration cycle is configured in which the refrigerant circulates in the order of the compressor 11, the high-temperature water-refrigerant heat exchanger 12, the branch portion 13a, the cooling open-close valve 14a, the cooling expansion valve 15a, the interior evaporator 16, the evaporation pressure regulation valve 17, the merging portion 13b, and the compressor 11, and the refrigerant circulates in the order of the compressor 11, the high-temperature water-refrigerant heat exchanger 12, the branch portion 13a, the heat absorbing open-close valve 14b, the heat absorption expansion valve 15b, the exterior evaporator 18, the merging portion 13b, and the compressor 11.

In other words, in the dehumidification heating mode, the interior evaporator 16 and the exterior evaporator 18 are switched to a refrigerant circuit connected in parallel with the refrigerant flow. Further, in the cooling mode, the refrigerant circuit is switched to a refrigerant circuit that allows the refrigerant to flow into the interior evaporator 16.

In the cycle configuration, the air-conditioning control device 60 controls the operation of various control target devices, which are connected to the output side of the air-conditioning control device 60.

For example, the air-conditioning control device 60 controls the operation of the compressor 11 in the same manner as in the heating mode. In addition, the air-conditioning control device 60 operates the high-temperature heat medium pump 21 so as to exhibit a predetermined water pumping capability in the dehumidification heating mode. Similarly to the heating mode, the air-conditioning control device 60 controls the operation of the high-temperature flow rate regulation valve 24 so that the entire flow rate of the high-temperature heat medium flowing out from the water passage of the high-temperature water-refrigerant heat exchanger 12 flows into the heater core 22.

The air-conditioning control device 60 determines a control voltage of the blower 52 (the blowing capacity) in the same manner as that of the cooling mode and the heating mode. The air-conditioning control device 60 controls the operation of the air mixing door 54 so that the air flow passage on the heater core 22 side is fully opened to close the cold air bypass passage 55 in the same manner as in the heating mode. The air-conditioning control device 60 also appropriately determines control signals to be output to other various control target devices.

Therefore, in the refrigeration cycle device 10 in the dehumidification heating mode, the high temperature and high-pressure refrigerant discharged from the compressor 11 flows into the high-temperature water-refrigerant heat exchanger 12. In the high-temperature water-refrigerant heat exchanger 12, since the high-temperature heat medium pump 21 is operating, the high-pressure refrigerant and the high-temperature heat medium exchange a heat with each other, the high-pressure refrigerant is cooled and condensed, and the high-temperature heat medium is heated.

In the high-temperature heat medium circuit 20, similarly to the heating mode, the high-temperature heat medium heated by the high-temperature water-refrigerant heat exchanger 12 flows into the heater core 22 through the high-temperature flow rate regulation valve 24. The high-temperature heat medium flowing into the heater core 22 exchanges a heat with the ventilation air passing through the interior evaporator 16 to radiate the heat, similarly to the heating mode.

As a result, the ventilation air passing through the interior evaporator 16 is heated, and the temperature of the ventilation air approaches the target blowing temperature TAO. The high-temperature heat medium flowing out from the heater core 22 is drawn into the high-temperature heat medium pump 21 and is pumped to the water passage of the high-temperature water-refrigerant heat exchanger 12 again.

The high-pressure refrigerant flowing out from the refrigerant passage of the high-temperature water-refrigerant heat exchanger 12 is branched at the branch portion 13a. One of the refrigerants branched by the branch portion 13a flows into the cooling expansion valve 15a and is reduced in pressure, similarly to the cooling mode. At this time, the throttle opening degree of the cooling expansion valve 15a is adjusted so that the degree of superheat of the refrigerant on the outlet side of the interior evaporator 16 becomes 3° C.

The low-pressure refrigerant reduced in pressure by the cooling expansion valve 15a flows into the interior evaporator 16. The refrigerant flowing into the interior evaporator 16 absorbs the heat from the ventilation air blown from the blower 52 and evaporates. As a result, the ventilation air is cooled and dehumidified. At this time, the refrigerant evaporation temperature in the interior evaporator 16 is maintained at 1° C. or more by the action of the evaporation pressure regulation valve 17 regardless of the refrigerant discharge capacity of the compressor 11.

The refrigerant flowing out from the interior evaporator 16 flows into one refrigerant inflow port of the merging portion 13b through the evaporation pressure regulation valve 17.

Similar to the heating mode, the other refrigerant branched by the branch portion 13a flows into the heat absorption expansion valve 15b and is reduced in pressure. At this time, the throttle opening degree of the heat absorption expansion valve 15b is adjusted so that the refrigerant on the outlet side of the exterior evaporator 18 is in a gas-liquid two-phase state.

The low-pressure refrigerant reduced in pressure by the heat absorption expansion valve 15b flows into the exterior evaporator 18. The refrigerant flowing into the exterior evaporator 18 absorbs a heat from the outside air blown from the outside air fan and evaporates. The refrigerant flowing out from the exterior evaporator 18 flows into the other refrigerant inflow port of the merging portion 13b.

In the merging portion 13b, the refrigerant in the gas-phase state having the degree of superheat flowing out from the interior evaporator 16 and the refrigerant in the gas-liquid two-phase state flowing out from the exterior evaporator 18 are merged with each other. In the present embodiment, the flow coefficient, the heat exchange performance of the interior evaporator 16, and the heat exchanging performance of the exterior evaporator 18 in each passage of the branch portion 13a are set so that the merged refrigerant approaches the saturated gas-phase refrigerant. The refrigerant flowing out from the merging portion 13b is drawn into the compressor 11 and compressed again.

Therefore, in the dehumidification heating mode, the ventilation air cooled and dehumidified by the interior evaporator 16 is reheated by the heater core 22 and blown into the vehicle compartment, whereby dehumidifying and heating of the vehicle compartment can be performed.

As described above, according to the vehicular air conditioner 1 of the present embodiment, the refrigeration cycle device 10 switches the refrigerant circuit to another, thereby being capable of switching the cooling mode, the heating mode, and the dehumidification heating mode to each other, and being capable of realizing comfortable air conditioning in the vehicle compartment.

In this example, as in the present embodiment, in the refrigeration cycle device 10 in which the refrigerant circuit is switched to another in accordance with the operation mode, the cycle configuration tends to be complicated.

On the other hand, in the refrigeration cycle device 10 according to the present embodiment, the refrigerant circuit for causing the high-pressure refrigerant to flow into the same heat exchanger and the refrigerant circuit for causing the low-pressure refrigerant to flow into the same heat exchanger are not switched to each other. In other words, since there is no need to cause the high-pressure refrigerant to flow into the interior evaporator 16 and the exterior evaporator 18 even if the refrigerant circuit is switched to any refrigerant circuit, the refrigerant circuit can be switched to another with a simple configuration without complicating the cycle configuration.

Further, in the refrigeration cycle device configured to be capable of switching the operation mode, the state of the refrigerant on the outlet side of the heat exchanger functioning as the evaporator must be appropriately adjusted in accordance with the operation mode.

In contrast, in the present embodiment, as shown in FIG. 2, the cooling characteristic line CL1 indicating the throttle opening degree characteristic of the cooling expansion valve 15a and the heat absorption characteristic line CL2 indicating the throttle opening degree characteristic of the heat absorption expansion valve 15b are different from each other. Accordingly, the state of the cooling refrigerant flowing out from the interior evaporator 16 and the state of the heat absorbing refrigerant flowing out from the exterior evaporator 18 can be adjusted to appropriate states.

Specifically, as shown in FIG. 2, the reference temperature KT2 is set so that the heat absorption temperature T2 is lower than the reference temperature KT2 in the heating mode in which the refrigerant circuit is switched to a refrigerant circuit which does not allow the refrigerant to flow into the interior evaporator 16. Therefore, in the heating mode, the heat absorption pressure P2 can be set to be higher than the saturated pressure of the refrigerant, and the heat absorbing refrigerant can be brought into the gas-liquid two-phase state.

Therefore, there is a need to set the refrigerant evaporation temperature in the exterior evaporator 18 to be lower than the outside air temperature as in the heating mode, and even in the operation mode in which the circulating refrigerant flow rate circulating in the cycle tends to decrease, the refrigerator oil can be inhibited from stagnating in the exterior evaporator 18.

Further, in the cooling characteristic line CL1 according to the present embodiment, the cooling pressure P1 can be set to be lower than the saturated pressure of the refrigerant, and the cooling refrigerant can be brought in a gas-phase state having the degree of superheat. Therefore, when the refrigerant circuit is switched to a refrigerant circuit for allowing the refrigerant to flow into the interior evaporator 16 as in the cooling mode or the dehumidification heating mode, the ventilation air can be efficiently cooled by an evaporation latent heat of the refrigerant in the interior evaporator 16.

In other words, in the refrigeration cycle device 10 according to the present embodiment, the refrigerant circuit can be switched to another without complicating the cycle configuration. Further, according to the operation mode, the states of the refrigerant on the outlet side of the interior evaporator 16 as the cooling evaporator and the exterior evaporator 18 as the heat absorption evaporator can be appropriately adjusted.

In the refrigeration cycle device 10 according to the present embodiment, a normal charge type thermal expansion valve is employed as the cooling expansion valve 15a, and a cross charge type thermal expansion valve is employed as the heat absorption expansion valve 15b. Therefore, the state of the refrigerant flowing out from the interior evaporator 16 and the exterior evaporator 18 can be appropriately adjusted very easily by a mechanical mechanism without complicating the control mode of the cooling expansion valve 15a and the heat absorption expansion valve 15b.

In the refrigeration cycle device 10 according to the present embodiment, the heater core 22 is disposed in the high-temperature heat medium circuit 20 including the water-refrigerant heat exchanger 12 and circulating the high-temperature heat medium. Therefore, in the heating mode and the dehumidification heating mode, the high-temperature heat medium heated by the water-refrigerant heat exchanger 12 can flow into the heater core 22 to heat the ventilation air.

Further, the high-pressure heat medium having a uniform temperature can be allowed to flow into the heater core 22, and a temperature distribution can be inhibited from occurring in the ventilation air heated by the heater core.

In the refrigeration cycle device 10 according to the present embodiment, the high-temperature radiator 23 is disposed in the high-temperature heat medium circuit 20. Therefore, the heat absorbed from the ventilation air can be radiated to the outside air, and the vehicle compartment can be cooled.

Second Embodiment

Figure 4:
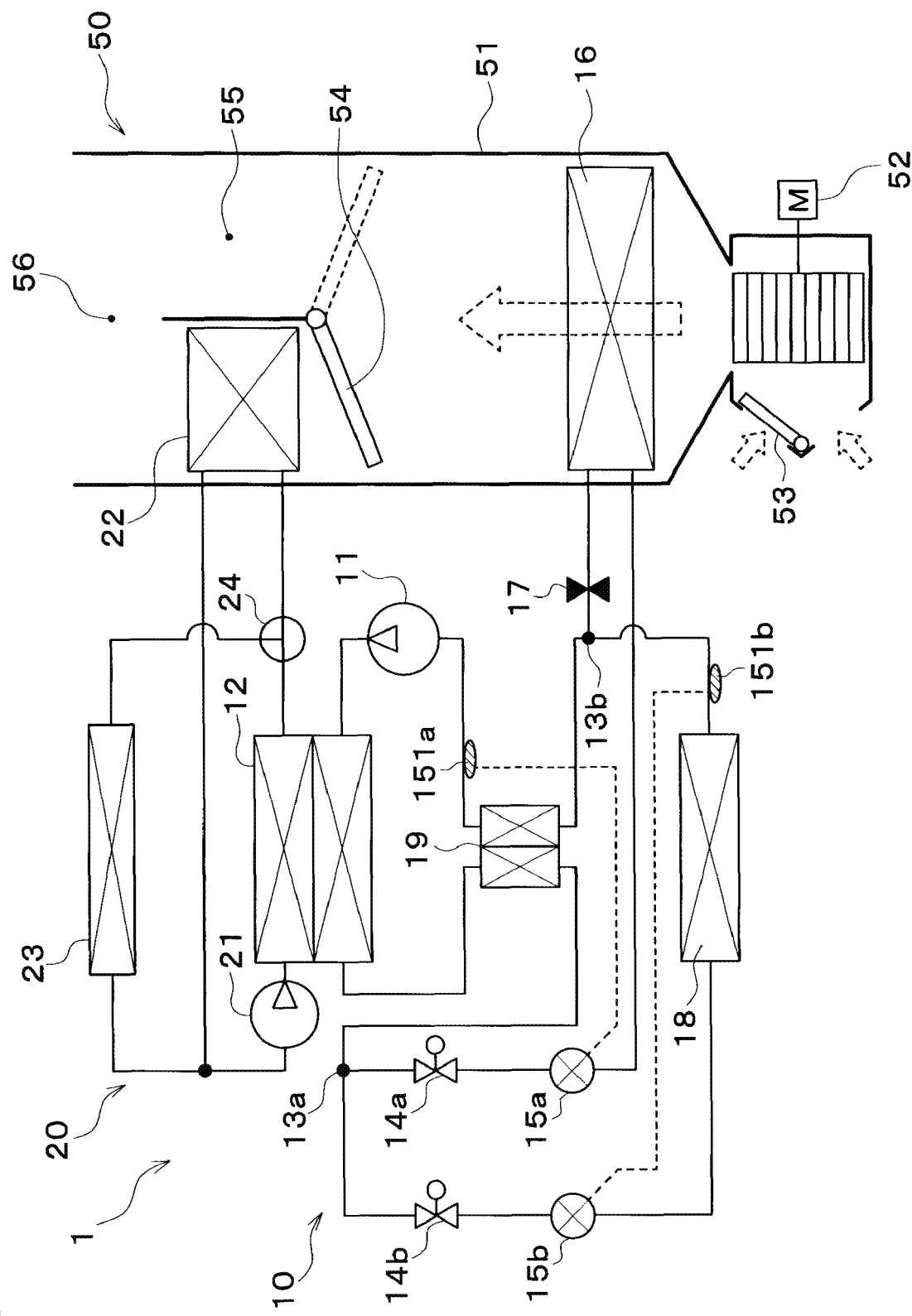
FIG. 4 is a configuration diagram of a vehicular air conditioner according to at least one embodiment.

In the present embodiment, an example will be described in which the internal heat exchanger 19 is added to the first embodiment as shown in an overall configuration diagram of FIG. 4. In FIG. 4, the same or equivalent parts as those of the first embodiment are denoted by the same reference numerals. This also applies to the following drawings.

Specifically, an internal heat exchanger 19 is a heat exchanger for exchanging a heat between a refrigerant flowing through a high-pressure refrigerant passage and a refrigerant flowing through a low-pressure refrigerant passage. The refrigerant flowing through the high-pressure refrigerant passage is a high-pressure refrigerant flowing out from a refrigerant passage of a water-refrigerant heat exchanger 12. The refrigerant flowing through the low-pressure refrigerant passage is a refrigerant flowing out from an exterior evaporator 18, which is a low-pressure refrigerant flowing out from a refrigerant outflow port of a merging portion 13b.

Figure 5:
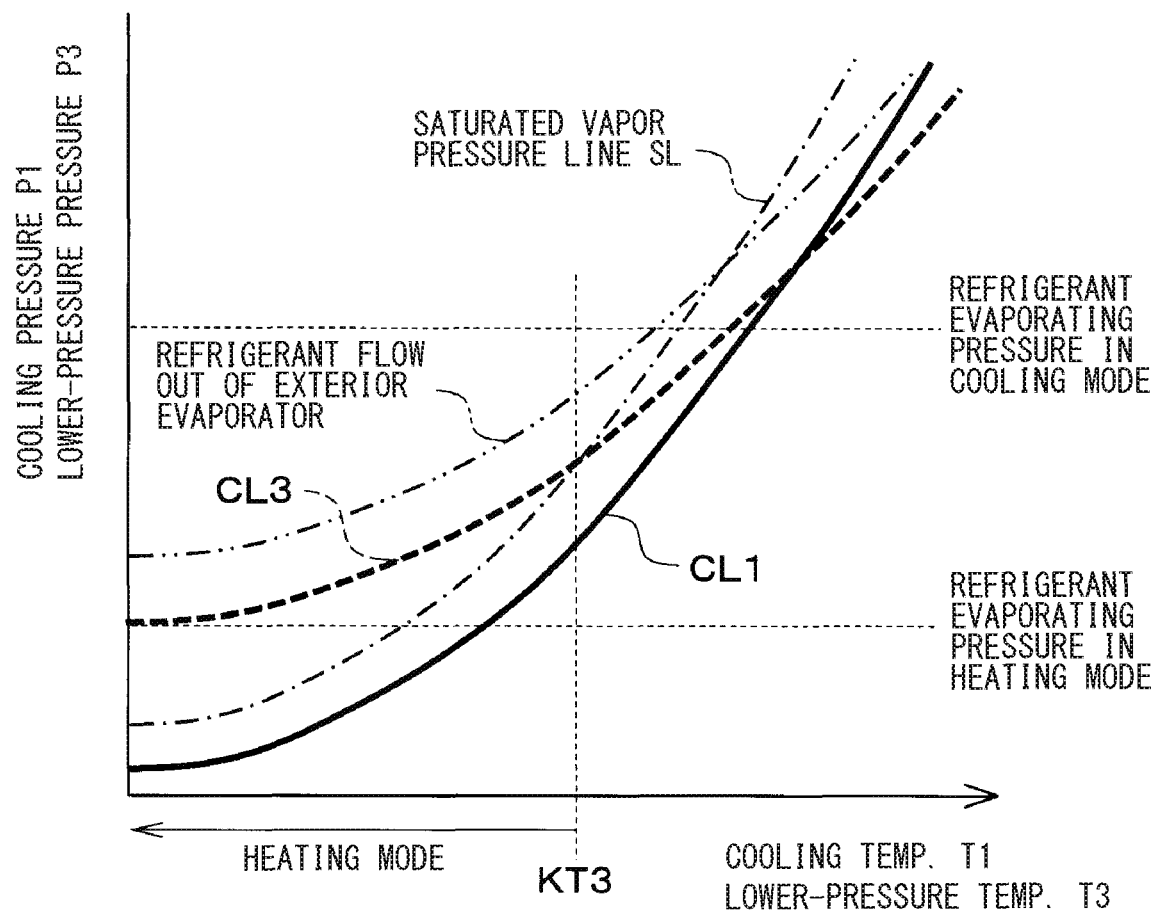
FIG. 5 is an illustrative diagram illustrating throttle opening degree characteristics of a cooling expansion valve and a heat absorption expansion valve according to at least one embodiment.

In the present embodiment, as shown in FIG. 5, a throttle opening degree characteristic of a heat absorption expansion valve 15b is determined.

More specifically, a temperature of the low-pressure refrigerant on an outlet side of the internal heat exchanger 19 is defined as a low-pressure temperature T3, and a pressure of the low-pressure refrigerant is defined as a low-pressure pressure P3. At this time, the heat absorption expansion valve 15b according to the present embodiment changes a throttle opening degree so that a change in the low-pressure pressure P3 corresponding to a change of the low-pressure temperature T3 draws a low-pressure characteristic line CL3 shown by a thick dashed line in FIG. 5, more specifically, approaches the low-pressure characteristic line CL3.

In this example, as is apparent from FIG. 5, the low-pressure characteristic line CL3 represents a line similar to the heat absorption characteristic line CL2 described in FIG. 2 of the first embodiment. Therefore, the cooling characteristic line CL1 and the low-pressure characteristic line CL3 are different from each other. Further, a slope of the low-pressure characteristic line CL3 is smaller than a slope of the cooling characteristic line CL1.

In ranges where the cooling temperature T1 and the low-pressure temperature T3 are lower than a predetermined reference temperature KT3, the low-pressure pressure P3 is higher than the cooling pressure P1 and the saturated pressure of the refrigerant.

For that reason, in the throttle opening degree characteristics of the heat absorption expansion valve 15b according to the present embodiment, the throttle opening degree is changed so that the heat absorbing refrigerant is brought in a gas-liquid two-phase condition in a range in which the low-pressure temperature T3 is lower than the reference temperature KT3. Further, in a range in which the low-pressure temperature T3 is higher than the reference temperature KT3, the throttle opening degree is changed so that the heat absorbing refrigerant is brought in a gas-phase state having a degree of superheating.

Further, the reference temperature KT3 according to the present embodiment is set to a value higher than a value that can be taken by the low-pressure temperature T3 when a heating mode operation is executed (specifically, 1° C.). For that reason, in the heating mode, the heat absorption expansion valve 15b changes the throttle opening degree so that the low-pressure refrigerant on the outlet side of the internal heat exchanger 19 is brought in a gas-liquid two-phase state.

A fine one-dot chain line in FIG. 5 is a saturated vapor pressure line SL of the refrigerant, and a fine two-dot chain line is a characteristic line showing a relationship between a heat absorption temperature T2 of the heat absorbing refrigerant and a heat absorption pressure P2 immediately after the refrigerant flows out from the exterior evaporator 18. The other configuration is the same as that of the first embodiment.

Next, the operation of the vehicular air conditioner 1 according to the present embodiment in the above configuration will be described. In a vehicular air conditioner 1 according to the present embodiment, similarly to the first embodiment, an operation mode is switched to another by executing an air conditioning control program. The operation of each operation mode will be described below.

(a) Cooling Mode

In a cooling mode, the air-conditioning control device 60 opens a cooling open-close valve 14a and closes a heat absorbing open-close valve 14b in the same manner as in the first embodiment.

Accordingly, in the refrigeration cycle device 10 in the cooling mode, a vapor compression type refrigeration cycle is configured in which the refrigerant circulates in the order of a compressor 11, the high-temperature water-refrigerant heat exchanger 12, the high-pressure refrigerant passage of the internal heat exchanger 19, a branch portion 13a, the cooling open-close valve 14a, the cooling expansion valve 15a, an interior evaporator 16, an evaporation pressure regulation valve 17, the merging portion 13b, the low-pressure refrigerant passage of the internal heat exchanger 19, and the compressor 11.

In this cycle configuration, the air-conditioning control device 60 controls the operation of the various control target devices connected to the output side in the same manner as in the cooling mode of the first embodiment. Therefore, in the cooling mode, the vehicle compartment can be cooled by blowing the ventilation air cooled by the interior evaporator 16 into the vehicle compartment in substantially the same manner as in the first embodiment.

(b) Heating Mode

In the heating mode, the air-conditioning control device 60 closes the cooling open-close valve 14a and opens the heat absorbing open-close valve 14b in the same manner as in the first embodiment.

Accordingly, in the refrigeration cycle device 10 in the heating mode, a vapor compression type refrigeration cycle is configured in which the refrigerant circulates in the order of the compressor 11, the high-temperature water-refrigerant heat exchanger 12, the high-pressure refrigerant passage of the internal heat exchanger 19, the branch portion 13a, the heat absorbing open-close valve 14b, the heat absorption expansion valve 15b, the exterior evaporator 18, the merging portion 13b, the low-pressure refrigerant passage of the internal heat exchanger 19, and the compressor 11.

In the above cycle configuration, the air-conditioning control device 60 controls the operation of the various control target devices connected to the output side in the same manner as in the heating mode of the first embodiment.

Therefore, in the refrigeration cycle device 10 in the heating mode, the high-pressure refrigerant discharged from the compressor 11 flows into the high-temperature water-refrigerant heat exchanger 12. As a result, similarly to the heating mode of the first embodiment, the ventilation air is heated by the heater core 22, and the temperature of the ventilation air approaches the target blowing temperature TAO.

The high-pressure refrigerant flowing out from the refrigerant passage of the high-temperature water-refrigerant heat exchanger 12 flows into the high-pressure refrigerant passage of the internal heat exchanger 19. The high-pressure refrigerant flowing into the high-pressure refrigerant passage of the internal heat exchanger 19 exchanges a heat with the low-pressure refrigerant flowing through the low-pressure refrigerant passage of the internal heat exchanger 19, thereby lowering an enthalpy.

The high-pressure refrigerant flowing out from the high-pressure refrigerant passage of the internal heat exchanger 19 flows into the heat absorption expansion valve 15b through the branch portion 13a and the heat absorbing open-close valve 14b, and is reduced in pressure. At this time, the throttle opening degree of the heat absorption expansion valve 15b is adjusted so that the low-pressure pressure P3 with respect to the low-pressure temperature T3 approaches the low-pressure characteristic line CL3 shown in FIG. 5.

The low-pressure refrigerant reduced in pressure by the heat absorption expansion valve 15b flows into the exterior evaporator 18. The refrigerant flowing into the exterior evaporator 18 absorbs a heat from the outside air, which is the heat source fluid blown from the outside air fan, and evaporates. The refrigerant flowing out from the exterior evaporator 18 flows into the low-pressure refrigerant passage of the internal heat exchanger 19 through the merging portion 13b.

The low-pressure refrigerant flowing into the low-pressure refrigerant passage of the internal heat exchanger 19 exchanges a heat with the high-pressure refrigerant flowing through the high-pressure refrigerant passage of the internal heat exchanger 19 to raise the enthalpy. The low-pressure refrigerant flowing out from the low-pressure refrigerant passage of the internal heat exchanger 19 is drawn into the compressor 11 and compressed again.

Therefore, in the heating mode, the vehicle compartment can be heated by blowing out the ventilation air heated by the heater core 22 into vehicle compartment.

(c) Dehumidification Heating Mode

In the dehumidification heating mode, the air-conditioning control device 60 opens the cooling open-close valve 14a and opens the heat absorbing open-close valve 14b, similarly to the first embodiment.

Therefore, in the refrigeration cycle device 10 in the dehumidification heating mode, a vapor compression type refrigeration cycle is configured in which the refrigerant circulates in the order of the compressor 11, the high-temperature water-refrigerant heat exchanger 12, the high-pressure refrigerant passage of the internal heat exchanger 19, the branch portion 13a, the cooling open-close valve 14a, the cooling expansion valve 15a, the interior evaporator 16, the evaporation pressure regulation valve 17, the merging portion 13b, the low-pressure refrigerant passage of the internal heat exchanger 19, and the compressor 11, and the refrigerant circulates in the order of the compressor 11, the high-temperature water-refrigerant heat exchanger 12, the high-pressure refrigerant passage of the internal heat exchanger 19, the branch portion 13a, the heat absorbing open-close valve 14b, the heat absorption expansion valve 15b, the exterior evaporator 18, the merging portion 13b, the low-pressure refrigerant passage of the internal heat exchanger 19, and the compressor 11.

In the above cycle configuration, the air-conditioning control device 60 controls the operation of the various control target devices connected to the output side in the same manner as in the dehumidification heating mode of the first embodiment.

Therefore, in the refrigeration cycle device 10 in the dehumidification heating mode, the high-pressure refrigerant discharged from the compressor 11 flows into the high-temperature water-refrigerant heat exchanger 12. As a result, similarly to the dehumidification heating mode of the first embodiment, the ventilation air that has passed through the interior evaporator 16 is heated by the heater core 22, and the temperature of the ventilation air approaches the target blowing temperature TAO.

The high-pressure refrigerant flowing out from the refrigerant passage of the high-temperature water-refrigerant heat exchanger 12 flows into the high-pressure refrigerant passage of the internal heat exchanger 19. As with the heating mode, the high-pressure refrigerant flowing into the high-pressure refrigerant passage of the internal heat exchanger 19 exchanges a heat with the low-pressure refrigerant flowing through the low-pressure refrigerant passage of the internal heat exchanger 19, thereby lowering an enthalpy.

The high-pressure refrigerant flowing out from the high-pressure refrigerant passage of the internal heat exchanger 19 is branched by the branch portion 13a. One of the refrigerants branched by the branch portion 13a flows into the cooling expansion valve 15a and is reduced in pressure, similarly to the cooling mode. At this time, the throttle opening degree of the cooling expansion valve 15a is adjusted so that the degree of superheat of the refrigerant on the outlet side of the interior evaporator 16 becomes 3° C.

The low-pressure refrigerant reduced in pressure by the cooling expansion valve 15a flows into the interior evaporator 16. The refrigerant flowing into the interior evaporator 16 absorbs the heat from the ventilation air blown from the blower 52 and evaporates. As a result, similarly to the first embodiment, the ventilation air is cooled and dehumidified. The refrigerant flowing out from the interior evaporator 16 flows into one refrigerant inflow port of the merging portion 13b through the evaporation pressure regulation valve 17.

Similar to the heating mode, the other refrigerant branched by the branch portion 13a flows into the heat absorption expansion valve 15b and is reduced in pressure. At this time, the throttle opening degree of the heat absorption expansion valve 15b is adjusted so that the refrigerant on the outlet side of the low-pressure refrigerant passage of the internal heat exchanger 19 is in a gas-liquid two-phase state.

The low-pressure refrigerant reduced in pressure by the heat absorption expansion valve 15b flows into the exterior evaporator 18. The refrigerant flowing into the exterior evaporator 18 absorbs a heat from the outside air blown from the outside air fan and evaporates. The refrigerant flowing out from the exterior evaporator 18 flows into the other refrigerant inflow port of the merging portion 13b.

In the merging portion 13b, the refrigerant in the gas-phase state having the degree of superheat flowing out from the interior evaporator 16 and the refrigerant in the gas-liquid two-phase state flowing out from the exterior evaporator 18 are merged with each other. The refrigerant flowing out from the refrigerant outflow port of the merging portion 13b flows into the low-pressure refrigerant passage of the internal heat exchanger 19.

The low-pressure refrigerant flowing into the low-pressure refrigerant passage of the internal heat exchanger 19 exchanges a heat with the high-pressure refrigerant flowing through the high-pressure refrigerant passage of the internal heat exchanger 19 to raise the enthalpy. The low-pressure refrigerant flowing out from the low-pressure refrigerant passage of the internal heat exchanger 19 is drawn into the compressor 11 and compressed again.

Therefore, in the dehumidification heating mode, the ventilation air cooled and dehumidified by the interior evaporator 16 is reheated by the heater core 22 and blown into the vehicle compartment, whereby dehumidifying and heating of the vehicle compartment can be performed.

As described above, according to the vehicular air conditioner 1 of the present embodiment, the refrigeration cycle device 10 switches the refrigerant circuit to another to switch the operation mode to another, thereby being capable of realizing comfortable air conditioning in the vehicle compartment.

Further, according to the refrigeration cycle device 10 of the present embodiment, similarly to the first embodiment, the refrigerant circuit can be switched to another with a simple configuration without complicating the cycle configuration. In addition, the states of the refrigerant on the outlet side of the interior evaporator 16, which is a cooling evaporator, and the exterior evaporator 18, which is a heat absorption evaporator, can be appropriately adjusted in accordance with the operation mode.

Specifically, as shown in FIG. 5, the reference temperature KT3 is set so that the low-pressure temperature T3 becomes lower than the reference temperature KT3 in the heating mode in which the refrigerant circuit is switched to the refrigerant circuit which does not allow the refrigerant to flow into the interior evaporator 16. Therefore, in the heating mode, the low-pressure pressure P3 can be set to a value higher than the saturated pressure of the refrigerant, and the low-pressure refrigerant flowing out from the low-pressure refrigerant passage of the internal heat exchanger 19 can be brought into the gas-liquid two-phase state.

Therefore, even in the operation mode in which the flow rate of the circulating refrigerant circulating in the cycle is likely to decrease, such as the heating mode, the refrigerator oil can be inhibited from stagnating in the exterior evaporator 18 and the internal heat exchanger 19.

Further, as for the cooling characteristic line CL1, similarly to the first embodiment, the cooling characteristic line can be brought in a gas-phase state in which the cooling refrigerant has the degree of superheat. Therefore, when the refrigerant circuit is switched to a refrigerant circuit for allowing the refrigerant to flow into the interior evaporator 16 as in the cooling mode or the dehumidification heating mode, the ventilation air can be efficiently cooled by an evaporation latent heat of the refrigerant in the interior evaporator 16.

Further, in the refrigeration cycle device 10 according to the present embodiment, since the internal heat exchanger 19 is provided, the enthalpy of the refrigerant flowing into the interior evaporator 16 and the exterior evaporator 18 can be lowered. Accordingly, the cooling capacity of the refrigerant in the heat exchanger functioning as the evaporator can be increased to improve the coefficient of performance (COP) of the refrigeration cycle device 10.

Further, in the refrigeration cycle device 10 according to the present embodiment, the refrigerant circuit for causing the high-pressure refrigerant to flow into the same heat exchanger and the refrigerant circuit for causing the low-pressure refrigerant to flow into the same heat exchanger are not switched to each other. Therefore, in the refrigerant circuit of any operation mode, the COP improvement effect can be obtained by providing the internal heat exchanger 19.

Third Embodiment

In the present embodiment, an example in which an exterior evaporator 18 is eliminated and a chiller 18a, a low-temperature heat medium circuit 30, and the like are employed as shown in an overall configuration diagram of FIG. 6 will be described as compared with the first embodiment.

The chiller 18a is a low-temperature water-refrigerant heat exchanger for exchanging a heat between a low-pressure refrigerant reduced in pressure by a heat absorption expansion valve 15b and a low-temperature heat medium circulating in a low-temperature heat medium circuit 30 at least in a heating mode and a dehumidification heating mode. Further, the chiller 18a is a heat absorption evaporator for evaporating the low-pressure refrigerant to exert a heat absorbing action. Therefore, a heat source fluid of the present embodiment is a low-temperature heat medium. The chiller 18a is disposed on a front side in a vehicle engine hood.

The chiller 18a has a refrigerant passage through which the low-pressure refrigerant reduced in pressure by the heat absorption expansion valve 15b flows. An outlet of the refrigerant passage of the chiller 18a is connected to the other refrigerant inflow port side of a merging portion 13b. The chiller 18a has a water passage through which the low-temperature heat medium circulating in a low-temperature heat medium circuit 30 flows. As the low-temperature heat medium, a solution containing ethylene glycol, an antifreeze solution, or the like can be employed.

In this example, the low-temperature heat medium circuit 30 is a low-temperature water circuit that circulates the low-temperature heat medium. In the low-temperature heat medium circuit 30, a water passage of the chiller 18a, a low-temperature heat medium pump 31, a cooling unit of a vehicle-mounted device 32, a low-temperature radiator 33, a low-temperature flow rate regulation valve 34, and the like are disposed.

The low-temperature heat medium pump 31 is a low-temperature water pump for pumping the low-temperature heat medium to an inlet side of the water passage of the chiller 18a in the low-temperature heat medium circuit 30. The basic configuration of the low-temperature heat medium pump 31 is an electric pump similar to that of the high-temperature heat medium pump 21. Therefore, a rotation speed of the low-temperature heat medium pump 31 (that is, a water pumping capacity) is controlled according to a control voltage output from the air-conditioning control device 60.

The vehicle-mounted device 32 is a heat generating device that generates a heat during operation, and the vehicle-mounted device of the present embodiment is a battery that supplies an electric quantity to a traveling electric motor. The cooling unit of the vehicle-mounted device 32 means a heat medium passage defined in a battery in order to allow the low-pressure heat medium to absorb the heat generated by the battery at the time of operation such as charging and discharging.

The low-temperature radiator 33 is a heat exchanger that exchanges a heat between the low-temperature heat medium cooled by the chiller 18a and an outside air blown from an outside air fan (not shown), and causes the low-temperature heat medium to absorb the heat of the outside air. The low-temperature radiator 33 is disposed on a front side in the vehicle engine hood. The low-temperature radiator 33 may be formed integrally with the chiller 18a or the like.

Figure 6:
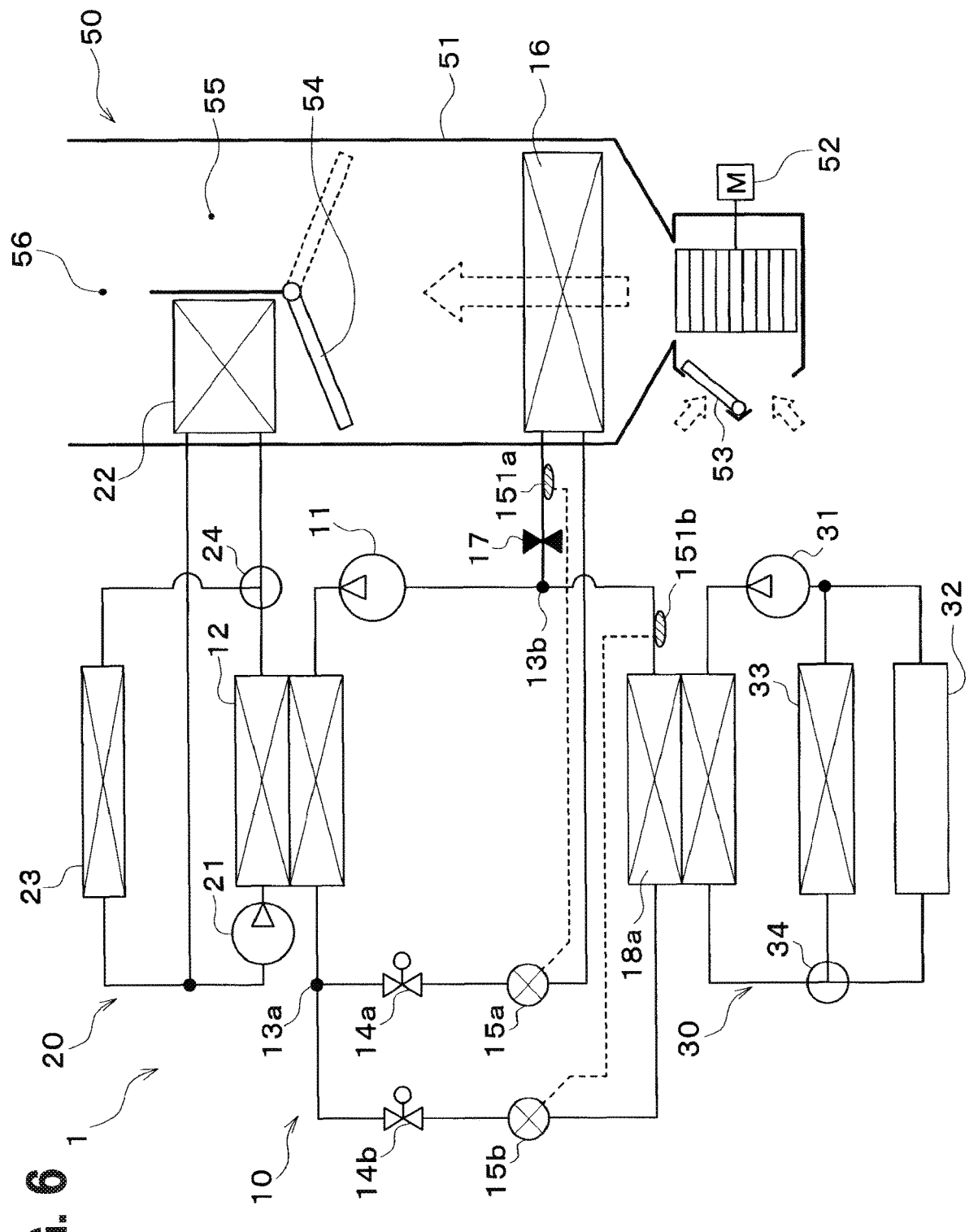
FIG. 6 is a configuration diagram of a vehicular air conditioner according to at least one embodiment.

As shown in FIG. 6, the cooling unit of the vehicle-mounted device 32 and the low-temperature radiator 33 are connected in parallel to a flow of the low-temperature heat medium in the low-temperature heat medium circuit 30.

The low-temperature flow rate regulation valve 34 is an electric three-way flow rate regulation valve for continuously regulating a low-temperature flow rate ratio between a flow rate of the low-temperature heat medium flowing into the cooling unit of the vehicle-mounted device 32 and a flow rate of the low-temperature heat medium flowing into the low-temperature radiator 33. A basic configuration of the low-temperature flow rate regulation valve 34 is the same as that of the high-temperature flow rate regulation valve 24. The operation of the low-temperature flow rate regulation valve 34 is controlled according to a control signal output from the air-conditioning control device 60.

The low-temperature flow rate regulation valve 34 is disposed at a connection portion between the heat medium inlet side of the cooling unit of the vehicle-mounted device 32 and the heat medium inlet side of the low-temperature radiator 33. In other words, the outlet of the water passage of the chiller 18a is connected to the inlet side of the low-temperature flow rate regulation valve 34. One outlet of the low-temperature flow rate regulation valve 34 is connected to the heat medium inlet side of the cooling unit of the vehicle-mounted device 32. The other outlet of the low-temperature flow rate regulation valve 34 is connected to the heat medium inlet side of the low-temperature radiator 33.

Therefore, in the low-temperature heat medium circuit 30, the low-temperature flow rate regulation valve 34 adjusts the low-temperature flow rate ratio, thereby being capable of adjusting the amount of heat absorbed from the vehicle-mounted device 32 by the low-temperature heat medium in the cooling unit of the vehicle-mounted device 32 and the amount of heat absorbed from the outside air by the low-temperature heat medium in the low-temperature radiator 33.

Figure 7:
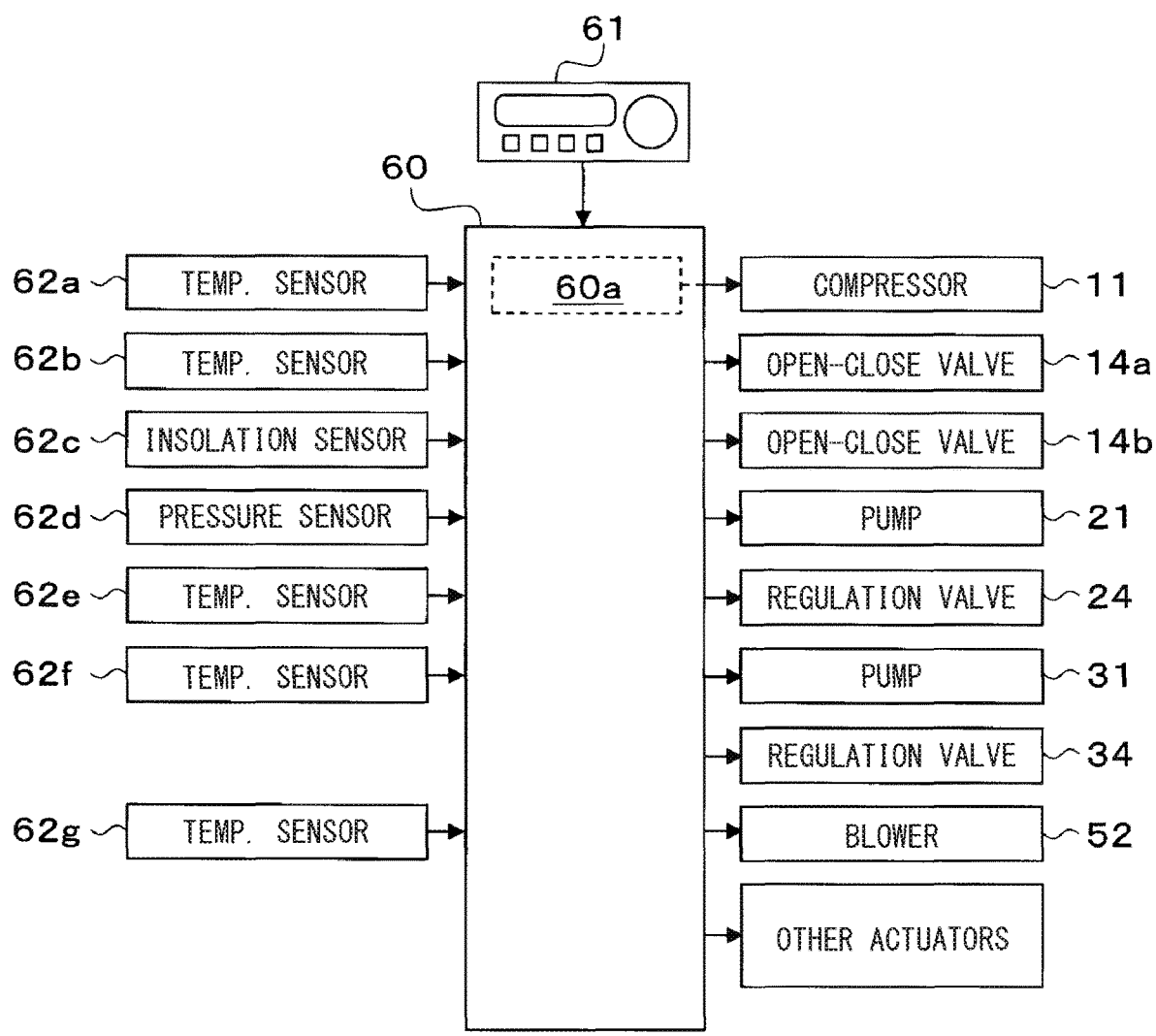
FIG. 7 is a block diagram showing an electric control unit of the vehicular air conditioner according to at least one embodiment.

As shown in FIG. 7, a battery temperature sensor 62g that detects a temperature BT of the battery, which is the vehicle-mounted device 32, is connected to the input side of the air-conditioning control device 60 according to the present embodiment. The other configuration is the same as that of the first embodiment.

Next, the operation of the vehicular air conditioner 1 according to the present embodiment in the above configuration will be described. In a vehicular air conditioner 1 according to the present embodiment, similarly to the first embodiment, an operation mode is switched to another by executing an air conditioning control program. The operation of each operation mode will be described below.

(a) Cooling Mode

In a cooling mode, the air-conditioning control device 60 opens a cooling open-close valve 14a and closes a heat absorbing open-close valve 14b in the same manner as in the first embodiment. Therefore, a refrigeration cycle which is exactly the same as that in the cooling mode of the first embodiment is configured.

Further, in the cooling mode, the air-conditioning control device 60 stops the low-temperature heat medium pump 31. The other control target devices are controlled in the same manner as in the cooling mode of the first embodiment. Therefore, the vehicle compartment can be cooled in exactly the same manner as in the first embodiment.

(b) Heating Mode

In the heating mode, the air-conditioning control device 60 closes the cooling open-close valve 14a and opens the heat absorbing open-close valve 14b in the same manner as in the first embodiment.

Accordingly, in the refrigeration cycle device 10 in the heating mode, a vapor compression type refrigeration cycle is configured in which the refrigerant circulates in the order of the compressor 11, the high-temperature water-refrigerant heat exchanger 12, the branch portion 13a, the heat absorbing open-close valve 14b, the heat absorption expansion valve 15b, the chiller 18a, the merging portion 13b, and the compressor 11.

Further, in the heating mode, the air-conditioning control device 60 operates the low-temperature heat medium pump 31 so as to exhibit a predetermined water pumping capability in the heating mode.

In addition, the air-conditioning control device 60 controls the operation of the low-temperature flow rate regulation valve 34 with reference to the temperature BT of the battery detected by the battery temperature sensor 62g so that the battery is maintained within a temperature range in which an appropriate charge/discharge performance can be exhibited. The other control target devices are controlled in the same manner as in the heating mode of the first embodiment.

Therefore, in the refrigeration cycle device 10 in the heating mode, the high-pressure refrigerant discharged from the compressor 11 flows into the high-temperature water-refrigerant heat exchanger 12. As a result, similarly to the heating mode of the first embodiment, the ventilation air is heated by the heater core 22, and the temperature of the ventilation air approaches the target blowing temperature TAO.

As in the heating mode of the first embodiment, the high-pressure refrigerant flowing out from the refrigerant passage of the high-temperature water-refrigerant heat exchanger 12 flows into the heat absorption expansion valve 15b through the branch portion 13a and the heat absorbing open-close valve 14b and is reduced in pressure. Therefore, the throttle opening degree of the heat absorption expansion valve 15b is adjusted so that the refrigerant on the outlet side of the chiller 18a is in the gas-liquid two-phase state.

The low-pressure refrigerant reduced in pressure by the heat absorption expansion valve 15b flows into the refrigerant passage of the chiller 18a. In the chiller 18a, since the low-temperature heat medium pump 31 is operating, the low-pressure refrigerant and the low-temperature heat medium exchange a heat with each other, and the low-pressure refrigerant absorbs the heat from the low-temperature heat medium and evaporates. As a result, the low-temperature heat medium is cooled. Therefore, the heat source fluid of the present embodiment is a low-pressure heat medium.

In the low-temperature heat medium circuit 30, a part of the low-temperature heat medium cooled by the chiller 18a flows into the low-temperature radiator 33 through the low-temperature flow rate regulation valve 34. The low-temperature heat medium flowing into the low-temperature radiator 33 is heated by exchanging the heat with the outside air. The remaining low-temperature heat medium cooled by the chiller 18a flows into the cooling unit of the battery, which is the vehicle-mounted device 32, through the low-temperature flow rate regulation valve 34 and is heated.

At this time, the low-temperature flow rate regulation valve 34 adjusts the low-temperature flow rate ratio so that the battery, which is the vehicle-mounted device 32, can exhibit an appropriate charge/discharge performance. The low-temperature heat medium flowing out from the low-temperature radiator 33 and the low-temperature heat medium flowing out from the cooling unit of the vehicle-mounted device 32 are drawn into the high-temperature heat medium pump 21, and are pumped to the water passage of the chiller 18a again.

The refrigerant flowing out from the refrigerant passage of the chiller 18a is drawn into the compressor 11 through the merging portion 13b and compressed again.

Therefore, in the heating mode, the vehicle compartment can be heated by blowing out the ventilation air heated by the heater core 22 into vehicle compartment.

(c) Dehumidification Heating Mode

In the dehumidification heating mode, the air-conditioning control device 60 opens the cooling open-close valve 14a and opens the heat absorbing open-close valve 14b, similarly to the first embodiment.

Accordingly, in the refrigeration cycle device 10 in the dehumidification heating mode, a vapor compression type refrigeration cycle is configured in which the refrigerant circulates in the order of the compressor 11, the high-temperature water-refrigerant heat exchanger 12, the branch portion 13a, the cooling open-close valve 14a, the cooling expansion valve 15a, the interior evaporator 16, the evaporation pressure regulation valve 17, the merging portion 13b, and the compressor 11, and the refrigerant circulates in the order of the compressor 11, the high-temperature water-refrigerant heat exchanger 12, the branch portion 13a, the heat absorbing open-close valve 14b, the heat absorption expansion valve 15b, the chiller 18a, the merging portion 13b, and the compressor 11.

Further, in the dehumidification heating mode, the air-conditioning control device 60 operates the low-temperature heat medium pump 31 so as to exhibit a predetermined water pumping capability in the heating mode. Similarly to the heating mode, the air-conditioning control device 60 controls the operation of the low-temperature flow rate regulation valve 34 so that the battery can be maintained within a temperature range capable of exhibiting an appropriate charging and discharging performance. The other control target devices are controlled in the same manner as in the dehumidification heating mode of the first embodiment.

Therefore, in the refrigeration cycle device 10 in the dehumidification heating mode, the high-pressure refrigerant discharged from the compressor 11 flows into the high-temperature water-refrigerant heat exchanger 12. As a result, similarly to the dehumidification heating mode of the first embodiment, the ventilation air that has passed through the interior evaporator 16 is heated by the heater core 22, and the temperature of the ventilation air approaches the target blowing temperature TAO.

The flow of the high-pressure refrigerant flowing out from the refrigerant passage of the high-temperature water-refrigerant heat exchanger 12 is branched at the branch portion 13a. One of the refrigerants branched by the branch portion 13a flows into the cooling expansion valve 15a and is reduced in pressure, similarly to the cooling mode. The low-pressure refrigerant reduced in pressure by the cooling expansion valve 15a flows into the interior evaporator 16. The refrigerant flowing into the interior evaporator 16 absorbs the heat from the ventilation air blown from the blower 52 and evaporates. As a result, the ventilation air is cooled.

At this time, the refrigerant evaporation temperature in the interior evaporator 16 is maintained at 1° C. or more by the action of the evaporation pressure regulation valve 17 regardless of the refrigerant discharge capacity of the compressor 11.

On the other hand, the other refrigerant branched by the branch portion 13a flows into the heat absorption expansion valve 15b and is reduced in pressure in the same manner as in the heating mode. The low-pressure refrigerant reduced in pressure by the cooling expansion valve 15a flows into the refrigerant passage of the chiller 18a. As with the heating mode, in the chiller 18a, since the low-temperature heat medium pump 31 is operating, the low-pressure refrigerant and the low-temperature heat medium exchange a heat with each other, and the low-pressure refrigerant absorbs the heat from the low-temperature heat medium and evaporates.

In the low-temperature heat medium circuit 30, similarly to the heating mode, the low-temperature heat medium absorbs the heat from the outside air and the battery, which is the vehicle-mounted device 32. The refrigerant flowing out from the refrigerant passage of the chiller 18a merges with the refrigerant flowing out from the evaporation pressure regulation valve 17 at the merging portion 13b, is drawn into the compressor 11, and is compressed again.

Therefore, in the dehumidification heating mode, the ventilation air cooled and dehumidified by the interior evaporator 16 is reheated by the heater core 22 and blown into the vehicle compartment, thereby being capable of performing dehumidifying and heating of the vehicle compartment.

As described above, according to the vehicular air conditioner 1 of the present embodiment, the refrigeration cycle device 10 switches the refrigerant circuit to another, thereby being capable of switching the cooling mode, the heating mode, and the dehumidification heating mode to each other, and being capable of realizing comfortable air conditioning in the vehicle compartment.

Further, according to the refrigeration cycle device 10 of the present embodiment, similarly to the first embodiment, the refrigerant circuit can be switched to another with a simple configuration without complicating the cycle configuration. In addition, the state of the refrigerant flowing out from the interior evaporator 16, which is a cooling evaporator, and the chiller 18a, which is a heat absorption evaporator, can be appropriately adjusted in accordance with the operation mode.

In the refrigeration cycle device 10 according to the present embodiment, a cooling unit of a battery, which is the vehicle-mounted device 32, and a low-temperature radiator 33 are disposed in the low-temperature heat medium circuit 30 that includes the chiller 18a and circulates the low-temperature heat medium. In the heating mode and the dehumidification heating mode, the refrigerant reduced in pressure by the heat absorption expansion valve 15b is caused to flow into the chiller 18a.

According to the above configuration, in the heating mode and the dehumidification heating mode, the heat of the low-temperature heat medium heated by a waste heat of the vehicle-mounted device 32 or the outside air is absorbed by the refrigerant, and the ventilation air can be surely heated by using the heat absorbed by the refrigerant as a heat source. Further, the vehicle-mounted device 32 can be cooled.

Fourth Embodiment

Figure 8:
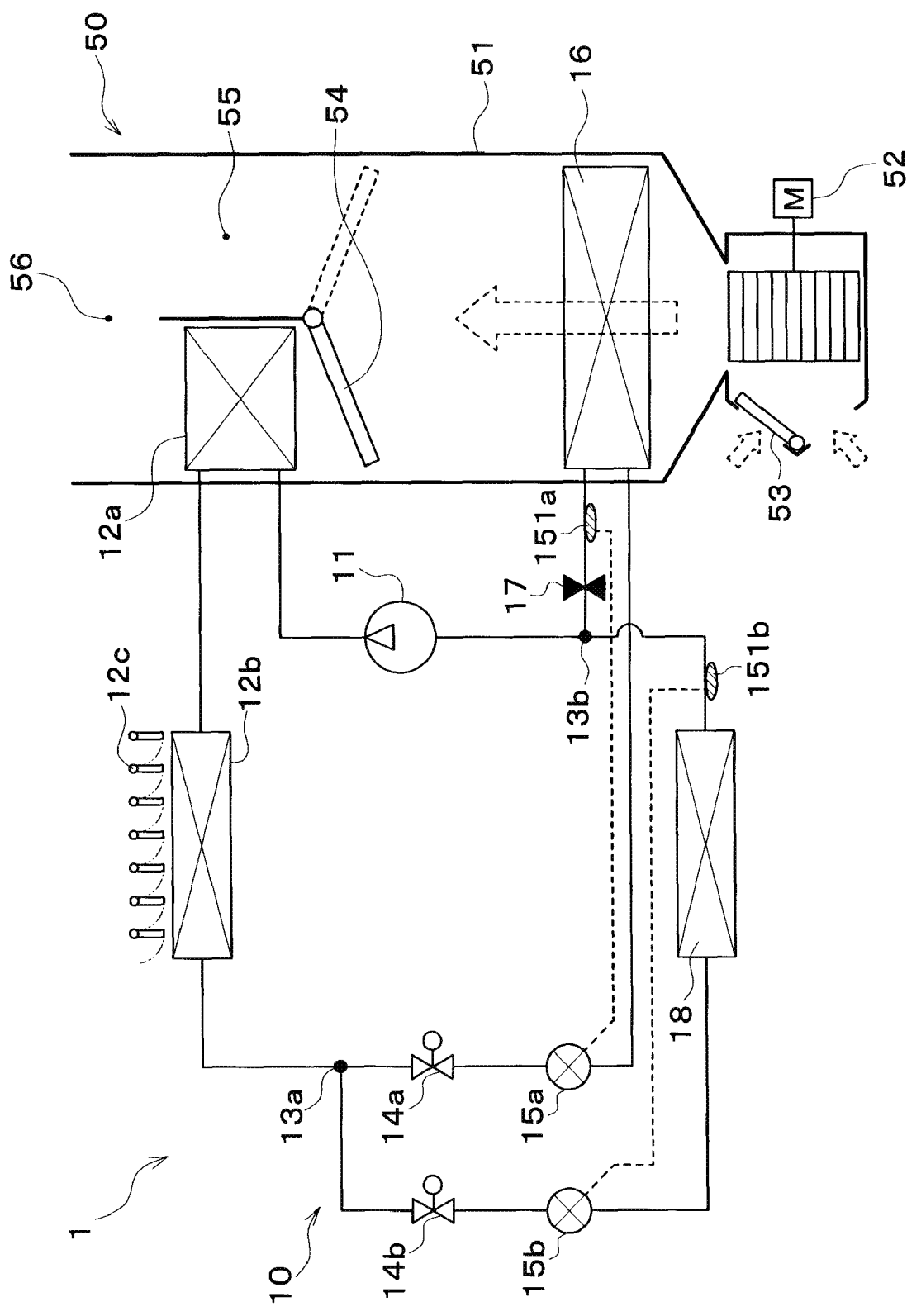
FIG. 8 is a configuration diagram of a vehicular air conditioner according to at least one embodiment.

In the present embodiment, as shown in an overall configuration diagram of FIG. 8, an example in which a high-temperature water-refrigerant heat exchanger 12, a high-temperature heat medium circuit 20, and the like are eliminated and an interior condenser 12a and an exterior heat exchanger 12b as heating units are adopted will be described as compared with the first embodiment.

The interior condenser 12a is a heat exchanger that heats a ventilation air by exchanging a heat between a high-temperature and high-pressure refrigerant discharged from a compressor 11 and the ventilation air. The interior condenser 12a is disposed in a casing 51 of an interior air conditioning unit 50 at the same position as that of the heater core 22 described in the first embodiment.

The exterior heat exchanger 12b is a heat exchanger that exchanges a heat between the refrigerant flowing out from the interior condenser 12a and the outside air blown from an outside air fan (not shown), and radiates the heat of the refrigerant to the outside air. The exterior heat exchanger 12b is disposed on a front side in a vehicle engine hood. Further, on an upstream side of the exterior heat exchanger 12b in an outside air flow, a shutter mechanism 12c for opening and closing an outside air flow path through which the outside air flows in the exterior heat exchanger 12b is disposed.

For that reason, when the shutter mechanism 12c closes the outside air passage, a heat exchange between the refrigerant and the outside air is not performed in the exterior heat exchanger 12b. The operation of the shutter mechanism 12c is controlled according to a control signal output from the air-conditioning control device 60. The other configuration is the same as that of the first embodiment.

Next, the operation of the vehicular air conditioner 1 according to the present embodiment in the above configuration will be described. In a vehicular air conditioner 1 according to the present embodiment, similarly to the first embodiment, an operation mode is switched to another by executing an air conditioning control program. The operation of each operation mode will be described below.

(a) Cooling Mode

In a cooling mode, the air-conditioning control device 60 opens a cooling open-close valve 14a and closes a heat absorbing open-close valve 14b in the same manner as in the first embodiment.

Accordingly, in the refrigeration cycle device 10 in the cooling mode, a vapor compression type refrigeration cycle is configured in which the refrigerant circulates in the order of the compressor 11, the interior condenser 12a, the exterior heat exchanger 12b, the branch portion 13a, the cooling open-close valve 14a, the cooling expansion valve 15a, the interior evaporator 16, the evaporation pressure regulation valve 17, the merging portion 13b, and the compressor 11.

Further, in the cooling mode, the air-conditioning control device 60 controls the operation of the shutter mechanism 12c so as to open the outside air passage of the exterior heat exchanger 12b. The other control target devices are controlled in the same manner as in the cooling mode of the first embodiment.

Therefore, in the refrigeration cycle device 10 in the cooling mode, the high temperature and high-pressure refrigerant discharged from the compressor 11 flows into the interior condenser 12a. In the cooling mode, the air mixing door 54 fully opens the cold air bypass passage 55 to close the air flow passage on the interior condenser 12a side. For that reason, the refrigerant flowing into the interior condenser 12a flows out from the interior condenser 12a and flows into the exterior heat exchanger 12b without radiating almost any heat to the ventilation air.

Since the shutter mechanism 12c opens the outside air passage of the exterior heat exchanger 12b, the refrigerant flowing into the exterior heat exchanger 12b radiates the heat to the outside air and condenses. The refrigerant flowing out from the exterior heat exchanger 12b flows into the cooling expansion valve 15a through the branch portion 13a and the cooling open-close valve 14a and is reduced in pressure. The subsequent operation is the same as that in the cooling mode of the first embodiment.

Therefore, in the cooling mode, the inside of the vehicle compartment can be cooled by blowing out the ventilation air cooled by the interior evaporator 16 into the vehicle compartment.

(b) Heating Mode

In the heating mode, the air-conditioning control device 60 closes the cooling open-close valve 14a and opens the heat absorbing open-close valve 14b.

Accordingly, in the refrigeration cycle device 10 in the heating mode, a vapor compression type refrigeration cycle is configured in which the refrigerant circulates in the order of the compressor 11, the interior condenser 12a, the exterior heat exchanger 12b, the branch portion 13a, the heat absorbing open-close valve 14b, the heat absorption expansion valve 15b, the exterior evaporator 18, the merging portion 13b, and the compressor 11.

Further, in the heating mode, the air-conditioning control device 60 controls the operation of the shutter mechanism 12c so as to close the outside air passage of the exterior heat exchanger 12b. The other control target devices are controlled in the same manner as in the heating mode of the first embodiment.

Therefore, in the refrigeration cycle device 10 in the heating mode, the high temperature and high-pressure refrigerant discharged from the compressor 11 flows into the interior condenser 12a. In the heating mode, the air mixing door 54 closes a cold air bypass passage 55 to fully open the air flow passage on the interior condenser 12a side. For that reason, the refrigerant flowing into the interior condenser 12a radiates the heat to the ventilation air and condenses. As a result, the ventilation air is heated, and the temperature of the ventilation air approaches the target blowing temperature TAO.

The refrigerant flowing out from the interior condenser 12a flows into the exterior heat exchanger 12b. The refrigerant flowing into the exterior heat exchanger 12b flows out from the exterior heat exchanger 12b with almost no heat dissipation to the outside air because the shutter mechanism 12c closes the outside air passage of the exterior heat exchanger 12b.

The refrigerant flowing out from the exterior heat exchanger 12b flows into the heat absorption expansion valve 15b through the branch portion 13a and the heat absorbing open-close valve 14b and is reduced in pressure. The subsequent operation is the same as that in the heating mode of the first embodiment.

Therefore, in the heating mode, the vehicle compartment can be heated by blowing out the ventilation air heated by the interior condenser 12a into vehicle compartment.

(c) Dehumidification Heating Mode

In the dehumidification heating mode, the air-conditioning control device 60 closes the cooling open-close valve 14a and opens the heat absorbing open-close valve 14b.

Accordingly, in the refrigeration cycle device 10 in the dehumidification heating mode, a vapor compression type refrigeration cycle is configured in which the refrigerant circulates in the order of the compressor 11, the interior condenser 12a, the exterior heat exchanger 12b, the branch portion 13a, the cooling open-close valve 14a, the cooling expansion valve 15a, the interior evaporator 16, the evaporation pressure regulation valve 17, the merging portion 13b, and the compressor 11, and the refrigerant circulates in the order of the compressor 11, the interior condenser 12a, the exterior heat exchanger 12b, the branch portion 13a, the heat absorbing open-close valve 14b, the heat absorption expansion valve 15b, the exterior evaporator 18, the merging portion 13b, and the compressor 11.

Further, in the heating mode, the air-conditioning control device 60 controls the operation of the shutter mechanism 12c so as to close the outside air passage of the exterior heat exchanger 12b. The other control target devices are controlled in the same manner as in the dehumidification heating mode of the first embodiment.

Therefore, in the refrigeration cycle device 10 in the dehumidification heating mode, the high temperature and high-pressure refrigerant discharged from the compressor 11 flows into the interior condenser 12a. The high temperature and high-pressure refrigerant flowing into the interior condenser 12a exchanges a heat with the ventilation air passing through the interior evaporator 16 to radiate the heat, similarly to the heating mode. As a result, the ventilation air is heated, and the temperature of the ventilation air approaches the target blowing temperature TAO.

The refrigerant flowing out from the interior condenser 12a flows into the exterior heat exchanger 12b. The refrigerant flowing into the exterior heat exchanger 12b flows out from the exterior heat exchanger 12b with almost no heat dissipation to the outside air because the shutter mechanism 12c closes the outside air passage of the exterior heat exchanger 12b.

The refrigerant flowing out from the exterior heat exchanger 12b is branched by the branch portion 13a. One of the refrigerants branched by the branch portion 13a flows into the cooling expansion valve 15a and is reduced in pressure, similarly to the cooling mode. Similar to the heating mode, the other refrigerant branched by the branch portion 13a flows into the heat absorption expansion valve 15b and is reduced in pressure. The subsequent operation is the same as that in the dehumidification heating mode of the first embodiment.

Therefore, in the dehumidification heating mode, the ventilation air cooled and dehumidified by the interior evaporator 16 is reheated by the interior condenser 12a and blown into the vehicle compartment, thereby being capable of performing dehumidifying and heating of the vehicle compartment.

As described above, according to the vehicular air conditioner 1 of the present embodiment, the refrigeration cycle device 10 switches the refrigerant circuit to another, thereby being capable of switching the cooling mode, the heating mode, and the dehumidification heating mode to each other, and being capable of realizing comfortable air conditioning in the vehicle compartment.

Further, according to the refrigeration cycle device 10 of the present embodiment, similarly to the first embodiment, the refrigerant circuit can be switched to another with a simple configuration without complicating the cycle configuration. In addition, the state of the refrigerant flowing out from the interior evaporator 16, which is a cooling evaporator, and the exterior evaporator 18, which is a heat absorption evaporator, can be appropriately adjusted in accordance with the operation mode.

The refrigeration cycle device 10 according to the present embodiment includes the interior condenser 12a. Therefore, in the heating mode and the dehumidification heating mode, the high temperature and high-pressure refrigerant discharged from the compressor 11 and the ventilation air can be directly exchanged in heat, thereby being capable of heating the ventilation air. The refrigeration cycle device 10 according to the present embodiment includes the exterior heat exchanger 12b. Therefore, the heat absorbed from the ventilation air can be radiated to the outside air, and the vehicle compartment can be cooled.

Fifth Embodiment

Figure 9:
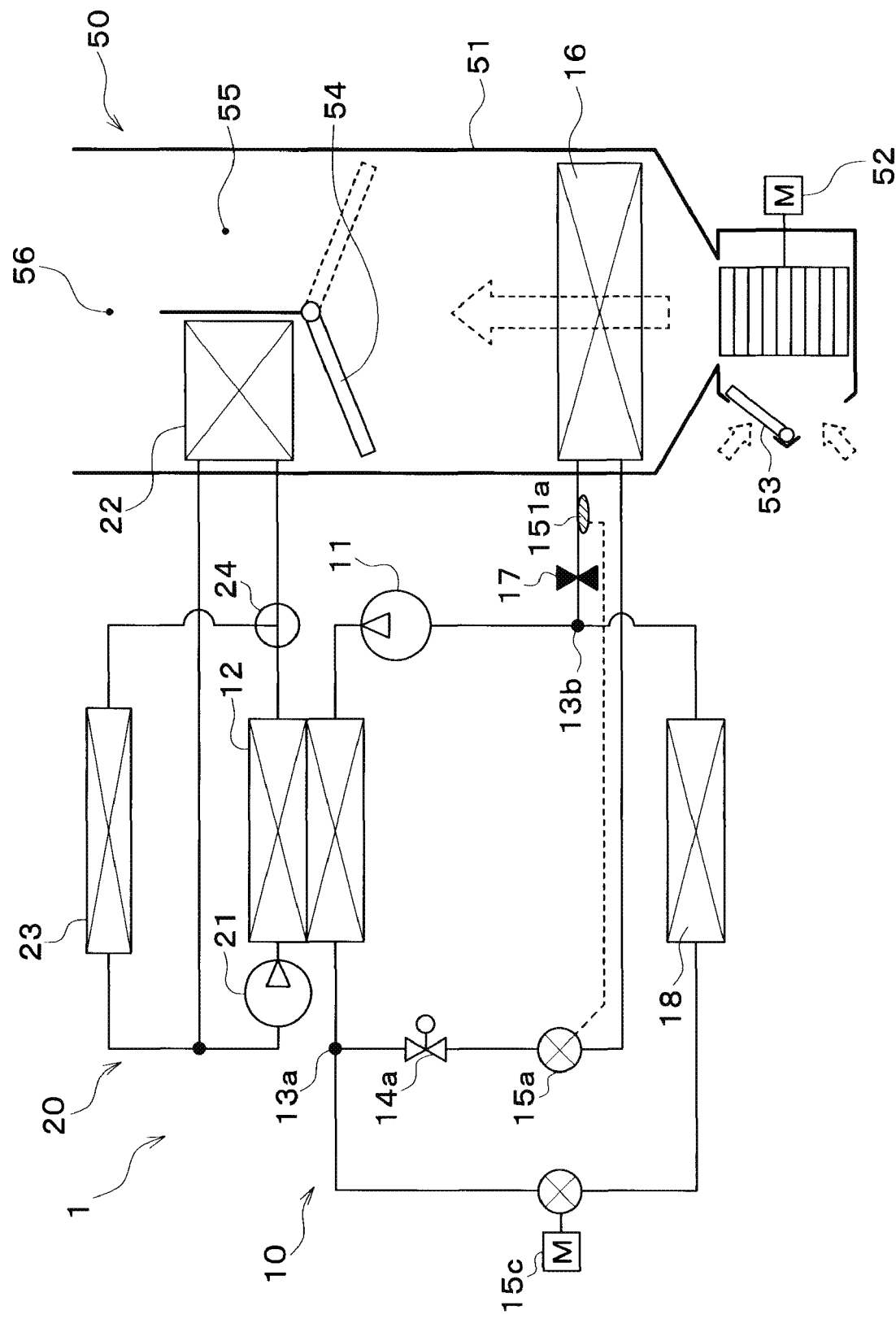
FIG. 9 is a configuration diagram of a vehicular air conditioner according to at least one embodiment.

In the present embodiment, as shown in an overall configuration diagram of FIG. 9, a description will be given of an example in which a heat absorbing open-close valve 14b is eliminated and an electric heat absorption expansion valve 15c (hereinafter, referred to as an electric expansion valve 15c) for changing a throttle opening degree by an electric mechanism is adopted as a heat absorption pressure reducing portion, as compared with the first embodiment.

The electric expansion valve 15c is a heat absorption pressure reducing portion that reduces a pressure of the refrigerant flowing out from the other refrigerant outflow port of the branch portion 13a. The electric expansion valve 15c is an electric variable throttle mechanism including a valve body configured to be able to change the throttle opening degree, and an electric actuator for changing the opening degree of the valve body (specifically, a stepping motor).

The operation of the electric expansion valve 15c is controlled according to a control signal (control pulse) output from the air-conditioning control device 60. Further, the electric expansion valve 15c has a fully closed function of blocking the refrigerant passage by fully closing the valve opening degree. Therefore, the electric expansion valve 15c according to the present embodiment also functions as a circuit switching valve.

Figure 10:
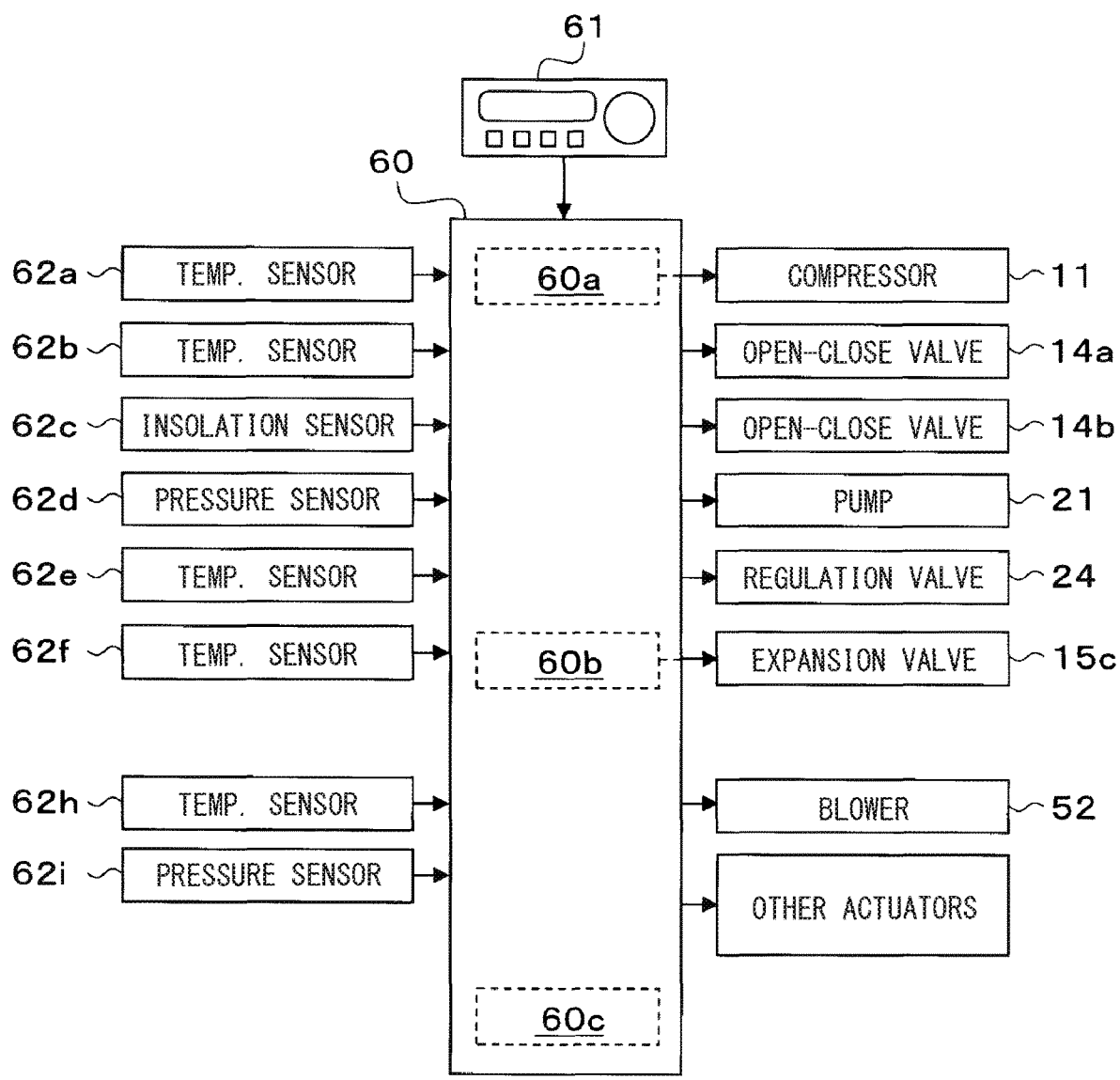
FIG. 10 is a block diagram showing an electric control unit of the vehicular air conditioner according to at least one embodiment.

As shown in FIG. 10, an outlet side temperature sensor 62h and an outlet side pressure sensor 62i are connected to an input side of the air-conditioning control device 60 according to the present embodiment. The outlet side temperature sensor 62h is an outlet side temperature detection unit that detects an outlet side temperature Te1 of the refrigerant on the outlet side of an exterior evaporator 18. The outlet side pressure sensor 62i is an outlet side pressure detection unit that detects an outlet side pressure Pe1 of the refrigerant on the outlet side of the exterior evaporator 18.

In the air-conditioning control device 60 according to the present embodiment, a configuration for controlling the operation of the electric expansion valve 15c is a heat absorption expansion valve control unit 60b. In a normal operation of a heating mode and a dehumidification heating mode, the heat absorption expansion valve control unit 60b controls the operation of the electric expansion valve 15c so that a change in a heat absorption pressure P2 corresponding to a change in a heat absorption temperature T2 approaches the heat absorption characteristic line CL2 shown by the thick dashed line in FIG. 2 described in the first embodiment.

In this example, in the heat absorption characteristic line CL2 of FIG. 2, the throttle opening degree of the heat absorption pressure reducing portion is changed so that the heat absorbing refrigerant is in a gas-liquid two-phase condition within a range in which the heat absorption temperature T2 is lower than a reference temperature KT2.

However, it is difficult to accurately detect the dryness or the like of the refrigerant in the gas-liquid two-phase state. Therefore, in the air-conditioning control device 60 according to the present embodiment, the operation of the electric expansion valve 15c is controlled with reference to a control map stored in advance in the air-conditioning control device 60 based on not only the outlet side temperature Te1 detected by the outlet side temperature sensor 62h and the outlet side pressure Pe1 detected by the outlet side pressure sensor 62i, but also the detection signals of the other sensors.

As a result, the heat absorption expansion valve control unit 60b according to the present embodiment controls the operation of the electric expansion valve 15c so that the change in the heat absorption pressure P2 corresponding to the change in the heat absorption temperature T2 approaches the heat absorption characteristic line CL2. Therefore, in the refrigeration cycle device 10 of the present embodiment, similarly to the first embodiment, the cooling mode, the heating mode, and the dehumidification heating mode can be switched to each other, and a comfortable air conditioning in the vehicle compartment can be realized.

Further, according to the refrigeration cycle device 10 of the present embodiment, similarly to the first embodiment, the refrigerant circuit can be switched to another with a simple configuration without complicating the cycle configuration. In addition, the states of the refrigerant on the outlet side of the interior evaporator 16, which is a cooling evaporator, and the exterior evaporator 18, which is a heat absorption evaporator, can be appropriately adjusted in accordance with the operation mode.

Incidentally, in the heating mode and the dehumidification heating mode, there is a need to lower the refrigerant evaporation temperature in the exterior evaporator 18 as compared with the outside air temperature. For that reason, in the heating mode and the dehumidification heating mode, frost may occur in the exterior evaporator 18. Therefore, in the refrigeration cycle device 10 according to the present embodiment, when it is determined that frosting has occurred in the exterior evaporator 18, the operation in the defrosting mode is performed.

More specifically, the air-conditioning control device 60 according to the present embodiment includes a frost determination unit 60c. The frosting determination unit 60c is a control program for determining whether or not frosting has occurred in the exterior evaporator 18. The frost determination unit 60c is executed every predetermined cycle as a subroutine of the air conditioning control program.

More specifically, the frosting determination unit according to the present embodiment employs a control program that determines that frosting has occurred in the exterior heat exchanger 18 when the outlet side temperature Te1 detected by the outlet side temperature sensor 62h is lower than a value obtained by subtracting a predetermined reference temperature a from an outside air temperature Tam detected by the outside air temperature sensor.

When the frost determination unit 60c determines that frost has occurred in the exterior evaporator 18 during the execution of the heating mode and the dehumidification heating mode, the operation of the defrosting mode is executed. In the defrosting mode, the air-conditioning control device 60 increases the throttle opening degree of the electric expansion valve 15c. As a result, the temperature of the refrigerant flowing into the exterior evaporator 18 is raised, and the frost generated in the exterior evaporator 18 can be melted and defrosted. The defrosting mode is continued until a predetermined reference defrosting time has elapsed.

As described above, in the present embodiment, since the electric expansion valve 15c is employed as the heat absorption pressure reducing portion, the defrosting mode can be executed by changing the throttle opening degree of the electric expansion valve 15c.

Other Embodiments

The present disclosure is not limited to the embodiments described above, and various modifications can be made as follows within a scope not departing from the spirit of the present disclosure.

(1) In the embodiments described above, an example in which the refrigeration cycle device 10 according to the present disclosure is applied to an air conditioner for an electric vehicle has been described, but the application of the refrigeration cycle device 10 is not limited to the above example. For example, the present disclosure may be applied to an air conditioner for a hybrid vehicle which obtains a driving force for a vehicle travel from both an internal combustion engine and an electric motor. Further, the present disclosure is not limited to a vehicle, and may be applied to a stationary air conditioner or the like.

(2) In the embodiments described above, the refrigeration cycle device 10 that can be switched to various operation modes has been described, but the operation mode is not limited to the above example.

The effects of the present disclosure can be obtained in which the state of the refrigerant on the outlet side of the heat exchanger functioning as the evaporator can be appropriately adjusted if at least the operation mode (for example, the dehumidification heating mode) in the refrigerant circuit for allowing the refrigerant to flow into the cooling evaporator and the operation mode (for example, the heating mode) in the refrigerant circuit that does not allow the refrigerant to flow into the cooling evaporator can be switched to each other.

Therefore, the refrigeration cycle device 10 may be applied to, for example, an air conditioner which does not operate in the cooling mode. In this case, the high-temperature radiator 23 of the high-temperature heat medium circuit 20 described in the first to third and fifth embodiments may be eliminated. Further, the exterior heat exchanger 12b described in the fourth embodiment may be eliminated.

In addition to the various operation modes described in the embodiments described above, the operation mode may be switched to a cooling-only operation mode. In the cooling-only operation mode, the heat absorbed by the low-temperature heat medium from the vehicle-mounted device 32 is absorbed by the refrigerant, and the heat is radiated to the outside air by the high-temperature radiator 23 or the exterior heat exchanger 12b. According to the above configuration, the vehicle-mounted device 32 can be cooled without performing the air conditioning in the vehicle compartment.

Further, in the cooling mode described above, similarly to the dehumidification heating mode, if the low-pressure refrigerant is caused to flow into both of the interior evaporator 16 and the exterior evaporator 18 or the chiller 18a, the vehicle-mounted device 32 can be cooled at the same time as the cooling of the vehicle compartment is performed.

(3) In the embodiments described above, the operation mode is switched to another on the basis of the target blowing temperature TAO and the detection signal of the air conditioning control sensor group, but the switching control of the operation mode is not limited to the above example. For example, the operation mode may be switched to another according to the outside air temperature Tam. In this case, the operation mode may be switched to the heating mode, the dehumidification heating mode, and the cooling mode in a stated order as the outside air temperature Tam rises. When the outside air temperature Tam is at a temperature at which the dehumidification heating mode is switched to the heating mode, a predetermined condition may be satisfied.

Further, the operation mode may be switched to another according to the refrigerant evaporation temperature in the interior evaporator 16 and the exterior evaporator 18 (or the chiller 18a). In this case, the operation mode may be switched to the heating mode, the dehumidification heating mode, and the cooling mode in a stated order as the refrigerant evaporation temperature rises. When the refrigerant evaporation temperature in the exterior evaporator 18 (or the chiller 18a) is a temperature at which the operation mode switches from the dehumidification heating mode to the heating mode, a predetermined condition may be satisfied.

The frost determination unit 60c described in the fifth embodiment is not limited to a determination unit that determines whether or not frost actually occurs in the exterior evaporator 18. For example, the frost determination unit 60c may be a determination unit that determines whether or not the operation conditions are such that frost may occur in the exterior evaporator 18, or a determination unit that determines whether or not there is a possibility that frost may occur in the exterior evaporator 18.

Therefore, the frost determination unit 60c may employ, for example, a control program that determines that frost has occurred in the exterior evaporator 18 when the outlet side temperature Tel detected by the outlet side temperature sensor 62h becomes equal to or lower than a predetermined frost reference temperature. In this case, it is desirable to set the frosting reference temperature to a value lower than 0° C.

(4) Each configuration of the refrigeration cycle device 10 is not limited to that disclosed in the above embodiments.

For example, in the embodiments described above, an example has been described in which an electric compressor is employed as the compressor 11, but an engine-driven type compressor may be employed when the compressor 11 is applied to a vehicle having an internal combustion engine. Further, as the engine-driven type compressor, a variable capacity type compressor configured to be capable of adjusting the refrigerant discharge capacity by changing the discharge capacity may be adopted.

In the refrigeration cycle device 10 according to the first to third and fifth embodiments, a receiver may be disposed in a refrigerant flow channel extending from the outlet of the refrigerant passage of the high-temperature water-refrigerant heat exchanger 12 to the refrigerant inflow port of the branch portion 13a. In the refrigeration cycle device 10 according to the fifth embodiment, the receiver is a gas-liquid separation unit that separates a gas and a liquid of the refrigerant flowing into the inside and stores an excess liquid-phase refrigerant of the cycle. In the refrigeration cycle device 10 according to the fifth embodiment, a receiver may be disposed in a refrigerant flow channel extending from the refrigerant outlet of the exterior heat exchanger 12b to the refrigerant inflow port of the branch portion 13a.

Further, in the embodiments described above, an example has been described in which a three-way joint structure is employed as the branch portion 13a, but an electric three-way flow rate regulation valve for adjusting a refrigerant flow rate ratio between the refrigerant flow rate flowing into the side of the cooling expansion valve 15a and a refrigerant flow rate flowing into the heat absorption expansion valve 15b may be employed as the branch portion 13a. In other words, the branch portion and the circuit switching valve may be integrally formed.

Further, the placement of the cooling open-close valve 14a and the heat absorbing open-close valve 14b is not limited to the refrigerant flow upstream side of the cooling pressure reducing portion and the heat absorption pressure reducing portion. The cooling on-off valve 14a and the heat absorbing open-close valve 14b may be disposed on the downstream side of the cooling pressure reducing portion and the heat absorption pressure reducing portion in the refrigerant flow.

Further, in the fifth embodiment described above, an example has been described in which a thermal expansion valve is employed as the cooling pressure reducing portion and an electrical expansion valve is employed as the heat absorption pressure reducing portion, but an electrical expansion valve may be employed as the cooling pressure reducing portion and a thermal expansion valve may be employed as the heat absorption pressure reducing portion.

In the second embodiment described above, an example in which the low-pressure refrigerant passage of the internal heat exchanger 19 is disposed on the downstream side of the merging portion 13b has been described, but the placement of the low-pressure refrigerant passage is not limited to the above example. For example, the low-pressure refrigerant passage may be disposed on the refrigerant flow downstream side of the heat absorption evaporator and on the upstream side of the merging portion 13b.

In the embodiments described above, an example in which the low-temperature radiator 33 and the battery as the vehicle-mounted device 32 are disposed in the low-temperature heat medium circuit 30 has been described, but at least one of the low-temperature radiator 33 and the vehicle-mounted device 32 may be disposed in the low-temperature heat medium circuit 30.

Further, the vehicle-mounted device 32 is not limited to the battery, and may be any heat generating device that generates a heat during operation. For example, as the vehicle-mounted device 32, an electric motor for outputting a travel driving force, an inverter for converting a frequency of an electric power supplied to the electric motor, a charger for charging the electric power to the battery, or the like may be employed. As the vehicle-mounted device 32, multiple heat generating devices may be employed and connected in parallel or in series to the flow of the low-temperature heat medium.

In the embodiments described above, a relationship between the high-temperature radiator 23 and the low-temperature radiator 33 is not mentioned, but the high-temperature radiator 23 and the low-temperature radiator 33 are not limited to configurations independent of each other.

For example, the high-temperature radiator 23 and the low-temperature radiator 33 may be integrated together such that the heat of the high-temperature heat medium and the heat of the low-temperature heat medium can be thermally transferred to each other. Specifically, some components (for example, heat exchange fins) of the high-temperature radiator 23 and the low-temperature radiator 33 may be commonalized to integrate the heat media together so as to be capable of performing a heat transfer.

In the embodiments described above, the refrigerant used in the refrigeration cycle device 10 is R134a, but the refrigerant is not limited to this example. For example, R1234yf, R600a, R410A, R404A, R32, R407C, and the like may be employed. Alternatively, a mixture refrigerant or the like in which multiple types of those refrigerants are mixed together may be employed.

(5) The components described in each of the above embodiments may be appropriately combined to the extent practicable.

For example, the exterior evaporator 18 of the refrigeration cycle device 10 including the internal heat exchanger 19 described in the second embodiment may be eliminated, and the chiller 18a, the low-temperature heat medium circuit 30, and the like may be applied similarly to the third embodiment.

Further, the internal heat exchanger 19 described in the second embodiment may be applied to the refrigeration cycle device 10 including the interior condenser 12a and the like as the heating unit described in the fourth embodiment, or the chiller 18a and the low-temperature heat medium circuit 30 and the like described in the third embodiment may be applied to the refrigeration cycle device 10.

In addition, the electric expansion valve 15c similar to that of the fifth embodiment may be employed as the heat absorption pressure reducing portion of the refrigeration cycle device 10 described in the second to fourth embodiments.

While the present disclosure has been described with reference to embodiments thereof, it is to be understood that the disclosure is not limited to the embodiments and constructions. To the contrary, the present disclosure is intended to cover various modification and equivalent arrangements. In addition, while the various elements are shown in various combinations and configurations, which are exemplary, other combinations and configurations, including more, less or only a single element, are also within the spirit and scope of the present disclosure.

What is claimed is:

1. A refrigeration cycle device for an air conditioner, comprising:
    a compressor that compresses and discharges a refrigerant mixed with a refrigerator oil;
    a heating unit that heats a ventilation air by using a heat of the refrigerant discharged from the compressor as a heat source;
    a branch passage that branches a flow of a high-pressure refrigerant flowing out from the heating unit;
    a cooling valve that reduces a pressure of the refrigerant flowing out from one refrigerant outflow port of the branch passage;
    a cooling evaporator that evaporates the refrigerant by heat exchange between the refrigerant reduced in pressure by the cooling valve and the ventilation air;

a heat absorption valve that reduces a pressure of the refrigerant flowing out from another refrigerant outflow port of the branch passage;

a heat absorption evaporator that evaporates the refrigerant by heat exchange between the refrigerant reduced in pressure by the heat absorption valve and a heat source fluid; and circuit switching valves that switch between a refrigerant circuit allowing the refrigerant to flow into the cooling evaporator and a refrigerant circuit preventing the refrigerant from flowing into the cooling evaporator, wherein the heat absorption valve adjusts a throttle opening degree to cause a heat-absorption refrigerant on an outlet side of the heat absorption evaporator to be in a gas-liquid two-phase state when the circuit switching valves are switched to the refrigerant circuit that prevents the refrigerant from flowing into the cooling evaporator and a predetermined condition is satisfied.

2. The refrigeration cycle device according to claim 1, wherein at least one of the cooling valve and the heat absorption valve is a thermal expansion valve that changes the throttle opening degree by a mechanical mechanism.

3. The refrigeration cycle device according to claim 1, wherein the heating unit includes an interior condenser that heats the ventilation air by radiating the heat of the refrigerant discharged by the compressor to the ventilation air.

4. The refrigeration cycle device according to claim 3, wherein the heating unit includes an exterior heating unit that radiates the heat of the refrigerant discharged by the compressor to the outside air.

* * * * *